(12) United States Patent
Mercier

(10) Patent No.: US 7,623,673 B2
(45) Date of Patent: Nov. 24, 2009

(54) VERSATILE WATERMARK TRANSPORT SYSTEM

(75) Inventor: Guillaume Mercier, Bourlon (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 799 days.

(21) Appl. No.: 11/392,874

(22) Filed: Mar. 30, 2006

(65) Prior Publication Data

US 2006/0222203 A1    Oct. 5, 2006

Related U.S. Application Data

(60) Provisional application No. 60/666,188, filed on Mar. 30, 2005.

(51) Int. Cl.
G06K 9/00 (2006.01)
(52) U.S. Cl. ..................... 382/100
(58) Field of Classification Search ............... 382/100
See application file for complete search history.

(56) References Cited

U.S. PATENT DOCUMENTS 6,614,844 B1 * 9/2003 Proehl ............... 375/240.08
6,865,747 B1 * 3/2005 Mercier ............... 725/94
7,162,642 B2 * 1/2007 Schumann et al. ............... 713/189

* cited by examiner

Primary Examiner—Tom Y Lu

(57) ABSTRACT

Watermark data may be transported by preprocessing one or more elementary data streams. Preprocessing may be achieved by demultiplexing the elementary data stream or by including an extra elementary data stream among the elementary data stream. To insert a watermark in either the elementary data stream or extra elementary data stream, a watermark object may be created by precomputing watermark change data using watermark metadata. Once created, the watermark object may be transported either by packetizing and multiplexing the watermark object into the elementary data stream or overwriting the extra elementary data stream. Afterwards, process takes place. Where packetizing and multiplexing occurs, processing includes demultiplexing the elementary data stream, creating a watermarked elementary data stream and reinserting the watermarked elementary data stream. Where overwriting occurs, processing may include discarding the watermark object upon completing watermarking and may include decoding the watermarked elementary data stream.

14 Claims, 23 Drawing Sheets

VERSATILE WATERMARK TRANSPORT SYSTEM

CROSS REFERENCE TO RELATED APPLICATIONS

The present application claims the benefit of provisional patent application Ser. No. 60/666,188 to Mercier, filed on Mar. 30, 2005, entitled "A Versatile Watermark Transport System," which is hereby incorporated by reference.

DETAILED DESCRIPTION

The disclosure involves securely transporting watermark data while ensuring proper synchronization with watermark applicable data streams. The technology is also backward compatible to account for data streams already in use in the industry.

I. Introduction

A program may have one or more elementary data streams. Each elementary data stream may or may not be MPEG coded. An example of non-MPEG encoding is the presence of private data coding coded into the elementary data stream.

MPEG defines ways of multiplexing more than one data stream (e.g., video, audio, data, etc.) to produce a program. It provides a framework for video, audio and data services. Implementable in various formats (e.g., DVB, DVD, HDTV, etc.), many versions of MPEG exist, including, but not limited to, MPEG-1, MPEG-2, MPEG-4, etc.

Two types of multiplexing schemes currently known are program stream and transport stream.

Program stream involves storing media and retrieving media from storage. Video, audio and/or elementary data streams may be grouped according to a common time base. Each program may consist of only one content channel. The program stream may be useful in error-free environments, where packet sizes may vary and may be large.

Generally, transport stream involves broadcast usage and may contain one or more content channels. In broadcast usage, it may be a multiplexed collection of concatenated program streams without a beginning or an end. This multiplexing may be referred to as a Single Program Transport Stream.

In addition to single program transport streams, the transport stream may also work with multiple program transport streams. Multiple programs may be multiplexed into a transport stream. One example is video channels being transmitted simultaneously.

The transport stream may comprise two stream layers. One is a packetized elementary stream layer for packetization of a video and/or audio stream. The other is a transport stream layer that may be used to partition the packetized elementary stream in the unit of a constant size and appending a header to each partitioned stream portion to make connections to an asynchronous transfer mode easier.

Figure 1:
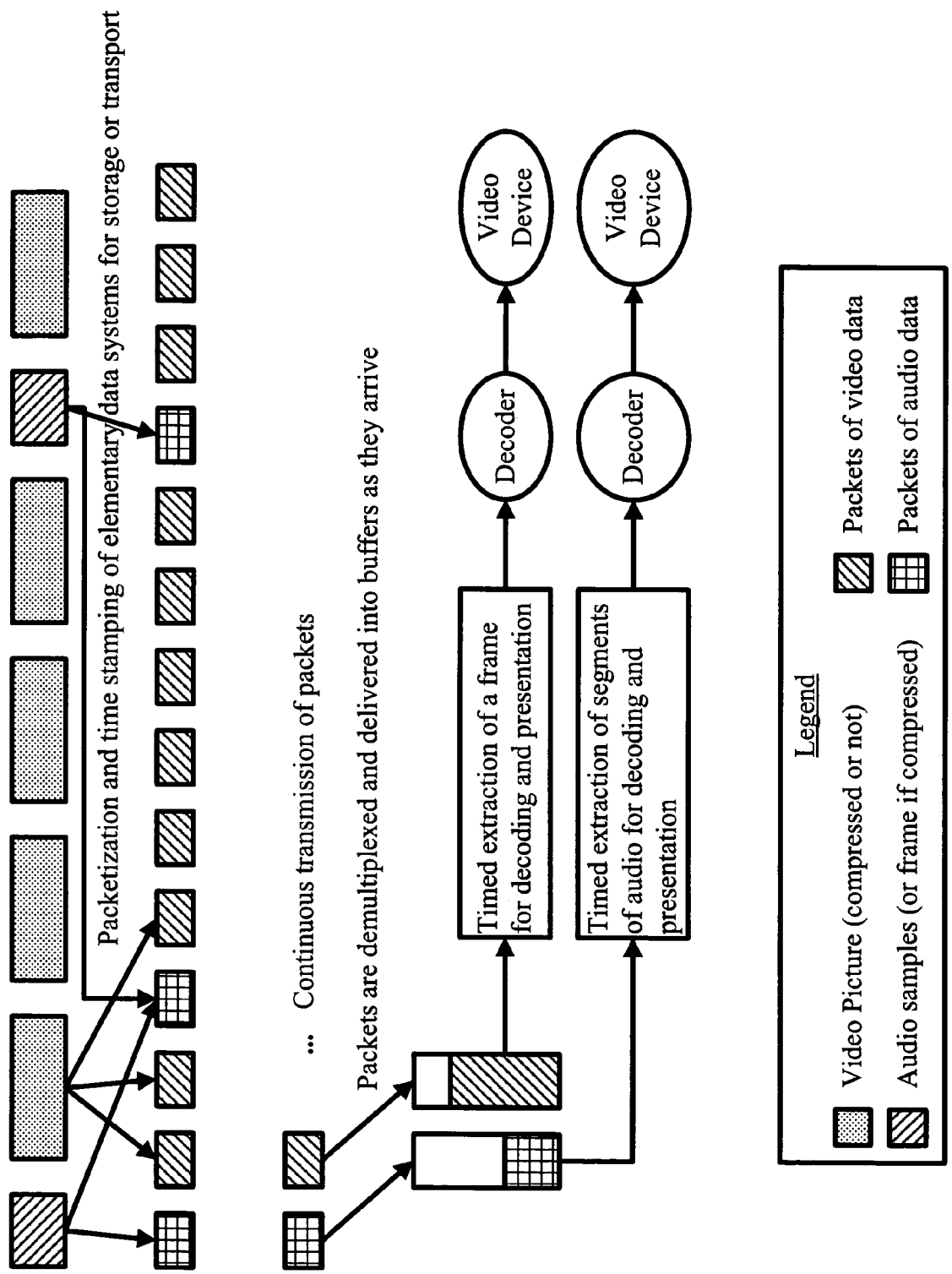
FIG. 1 shows an example of an interleaved audio and video model of data streams (e.g., AVI, MJPEG, MXF, etc.).

Generally, when elementary data streams are packetized and multiplexed, a model for packetizing and multiplexing may be used. The model may be directly tied to the system clock vs. no clock models. For container streams with system clocks, a "leaky bucket" buffering model, such as MPEG, may be used. This "leaky bucket" buffering model may be seen in FIG. 1. A set of cascaded buffers may be filled and emptied according to transmission data rates and decoding times, the goal being that bytes received from the continuous transmission of a data stream (referred to as "streaming") may be placed into a buffer. The buffer may get emptied either at a different data rate (e.g., the rate of a particular elementary stream being sent to its corresponding decoder) or at a certain discrete time (e.g., the decoder pulling a frame from a buffer).

The no clock model may be more basic and may consider that individual elementary data stream objects (e.g., pictures for video streams, frames of audio for compressed audio streams, etc.) may be extracted from the container file(s) one unit at a time, like in MXF for example, with a more openly defined intermediary buffer system, which may be selected by the implementer.

1. Audiovisual Content Storage and Transmission

Typically, an audiovisual content playback may be tied to a time reference. For example, a movie may be a succession of pictures displayed in a digital theater at a rate of 24 individual pictures per second. The movie may also be coupled with one or more audio tracks that may need to be played back synchronously with the pictures. Some data tracks may also present the same characteristics, such as sub-titles in a foreign language. These characteristics may need to be presented synchronously with the rest of the content. With digital streams, a clock may be assigned to the stream or derived from parameters stored in the stream, like the audio sampling frequency and the video frame rate.

Figure 2:
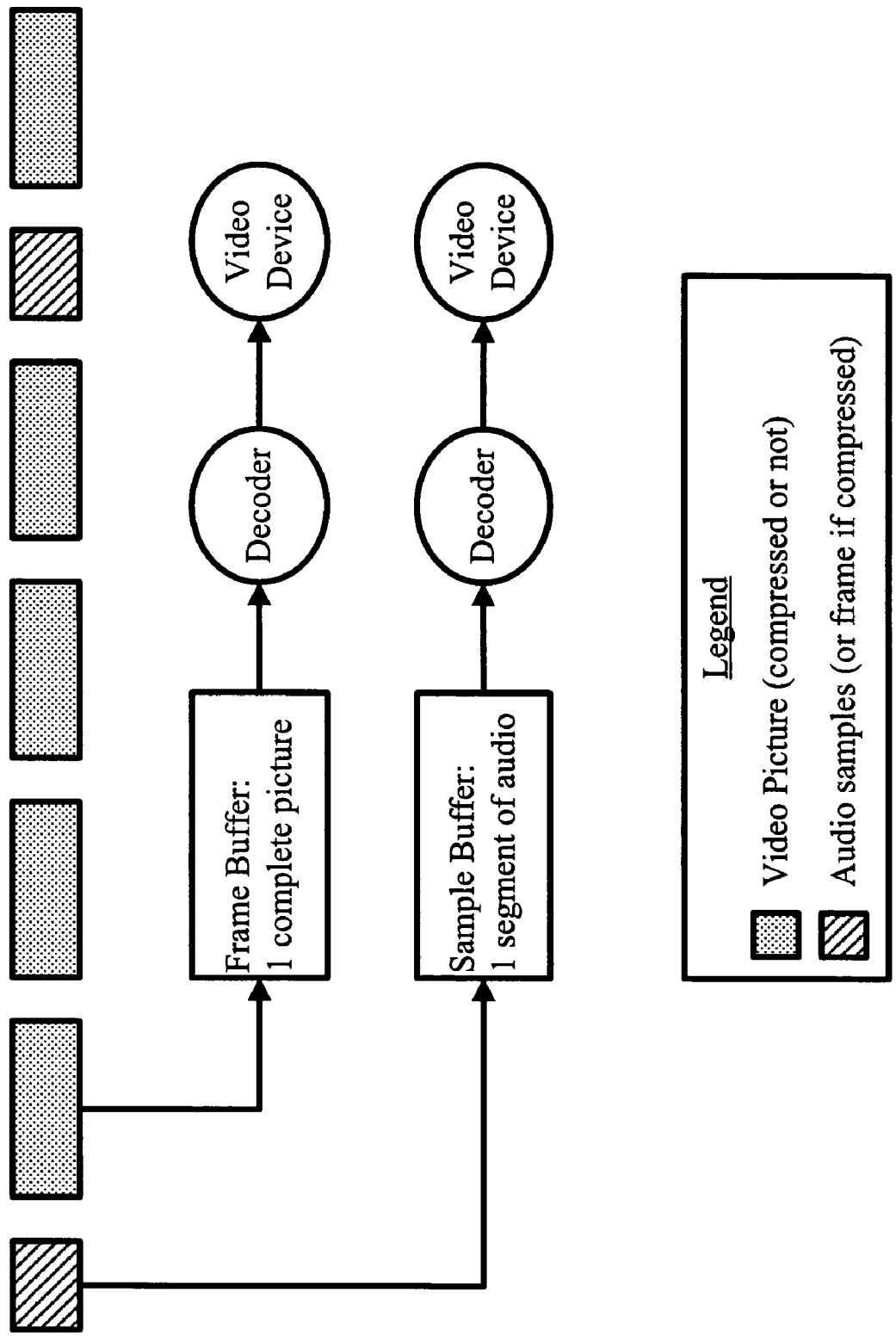
FIG. 2 shows an example of a streaming "leaky bucket" model for data streams storage and transport (e.g., MPEG).

Audio, video and other data streams may be interleaved sequentially in a container stream, as shown in FIG. 2, by using a wrapping layer made of packets containing bits from these elementary streams. To attain and keep perfect synchronization between elementary streams while compensating for clock drifts and unlocked clocks between various elementary stream generators, container streams often contain a reference clock. The elementary stream may refer to this reference clock. For example, in MPEG, the reference clock may be referred to as system clock reference. When the container stream does not provide a reference clock, elementary stream generators may have to be artificially adjusted to refer to a virtual reference clock. This adjustment may mean that clocks are supposed to be perfect between elementary streams.

In the case of the exemplified digital theatre above, this adjustment would mean that frames may be generated at a rate of exactly 24 frames per second and a 48 KHz audio stream may also be generated at that exact rate. For these container data streams, the clock may be derived from header information and may be assumed to be perfect (or to have already been adjusted). Sometimes, elementary streams may not be interleaved into a single container stream. Instead, they may be stored or transported as a set of independent files.

2. Watermarking

Figure 3:
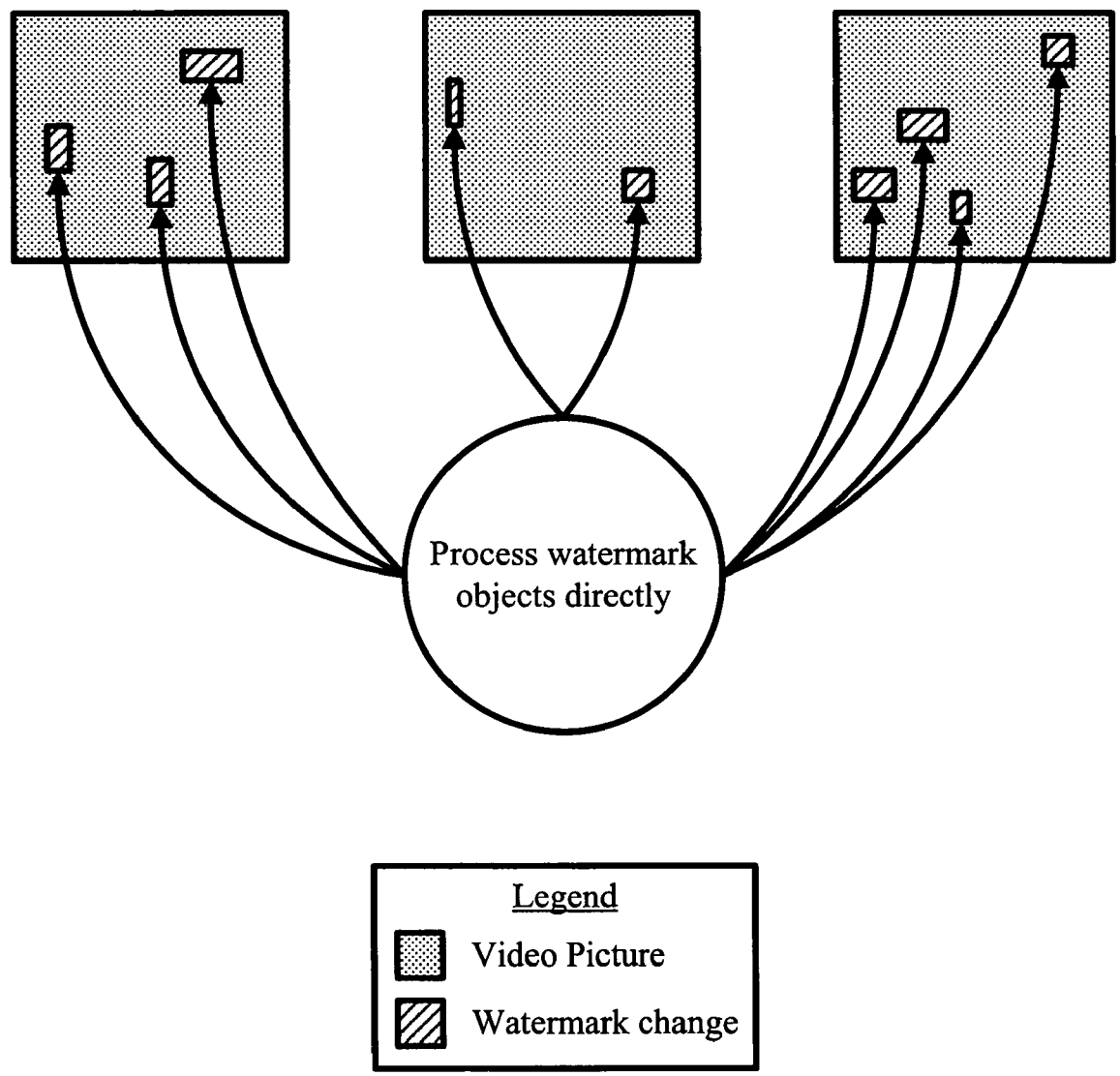
FIG. 3 shows an example of a direct processing watermarking model with no storage requirements.

Watermarking technology may be seen as altering a data stream according to a set of parameters to convey a message through modifications done to an already defined data stream. For example, these modifications may be implemented in a video and/or audio data stream. Resulting changes may be detectable by computer-based signal processing but remain invisible to the human eye. When watermarks are combined with the data stream, a series of changes may be used to transmit a hidden message. For instance, a hidden message may be a string of 1 and 0 binary digits. As seen in FIG. 3, watermarks may be processed directly into a video data stream without requiring any storage compartments.

Figure 4:
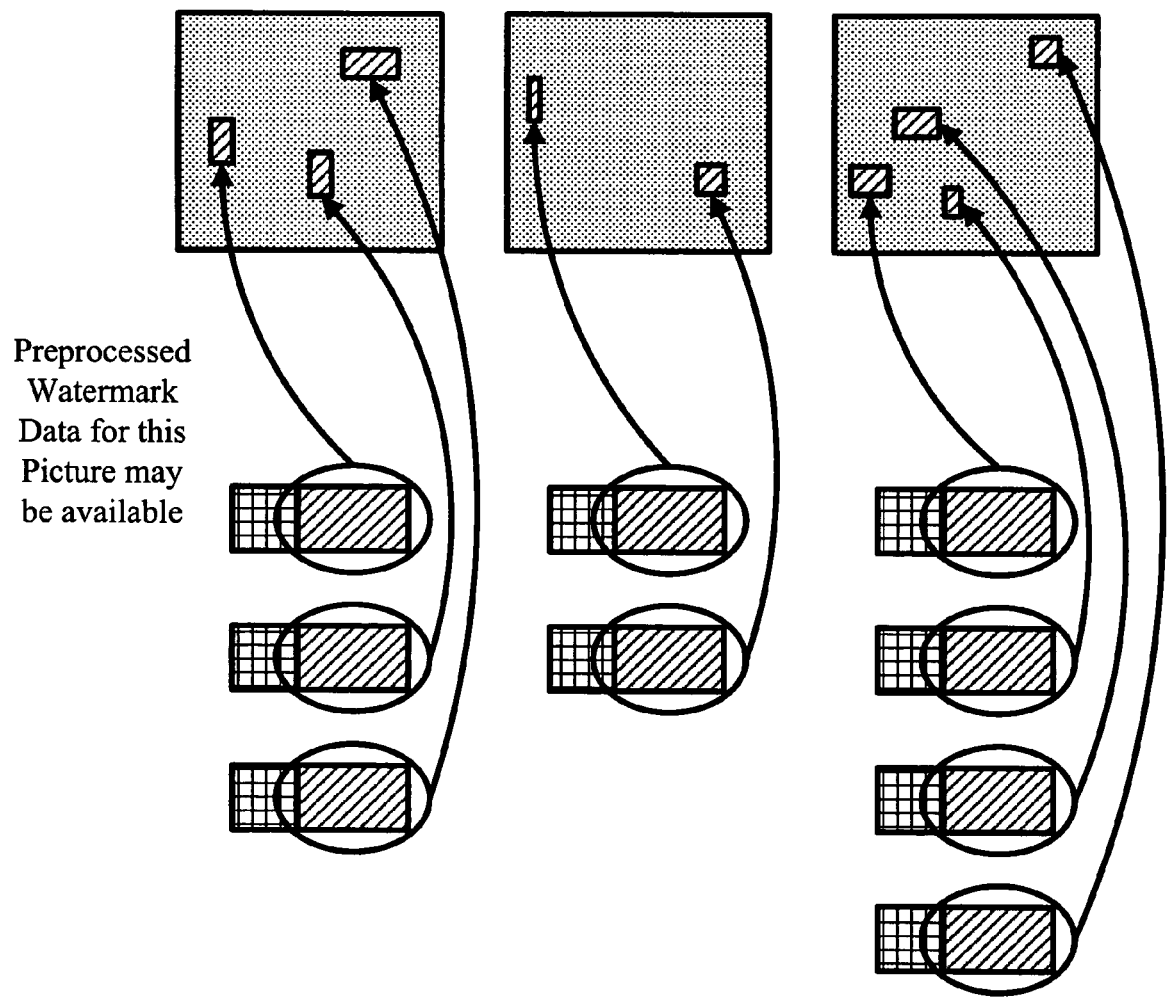
FIG. 4 shows an example of preprocessed watermarking that includes making a precomputed changed to a stream, whether compressed or not.
Figure 5:
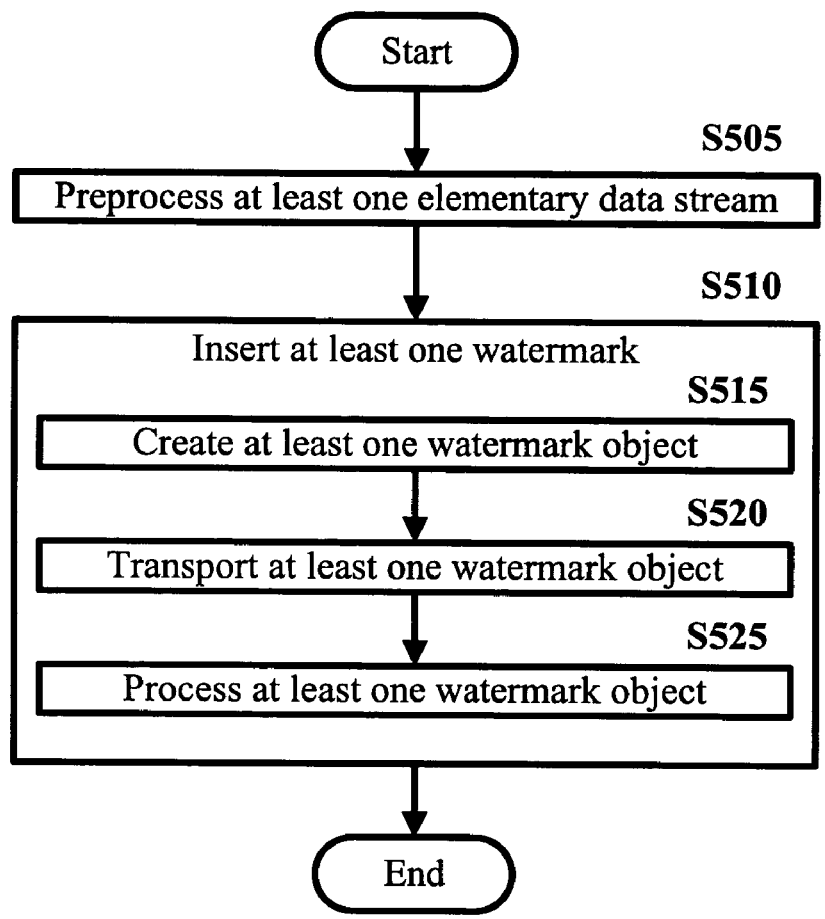
FIG. 5 shows an example of a flow diagram of transporting watermarked data.
Figure 6:
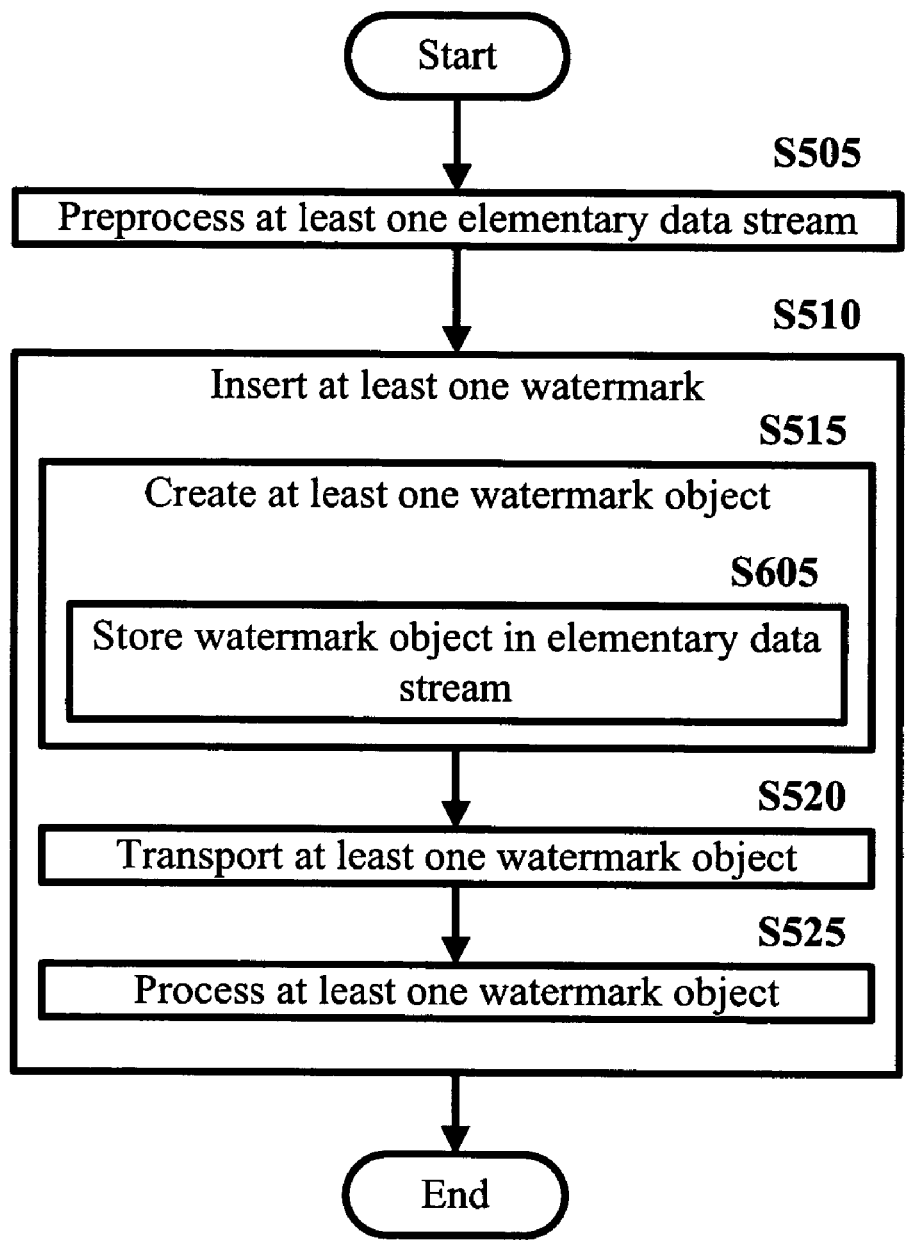
FIG. 6 shows yet another example of a flow diagram of transporting watermarked data.
Figure 7:
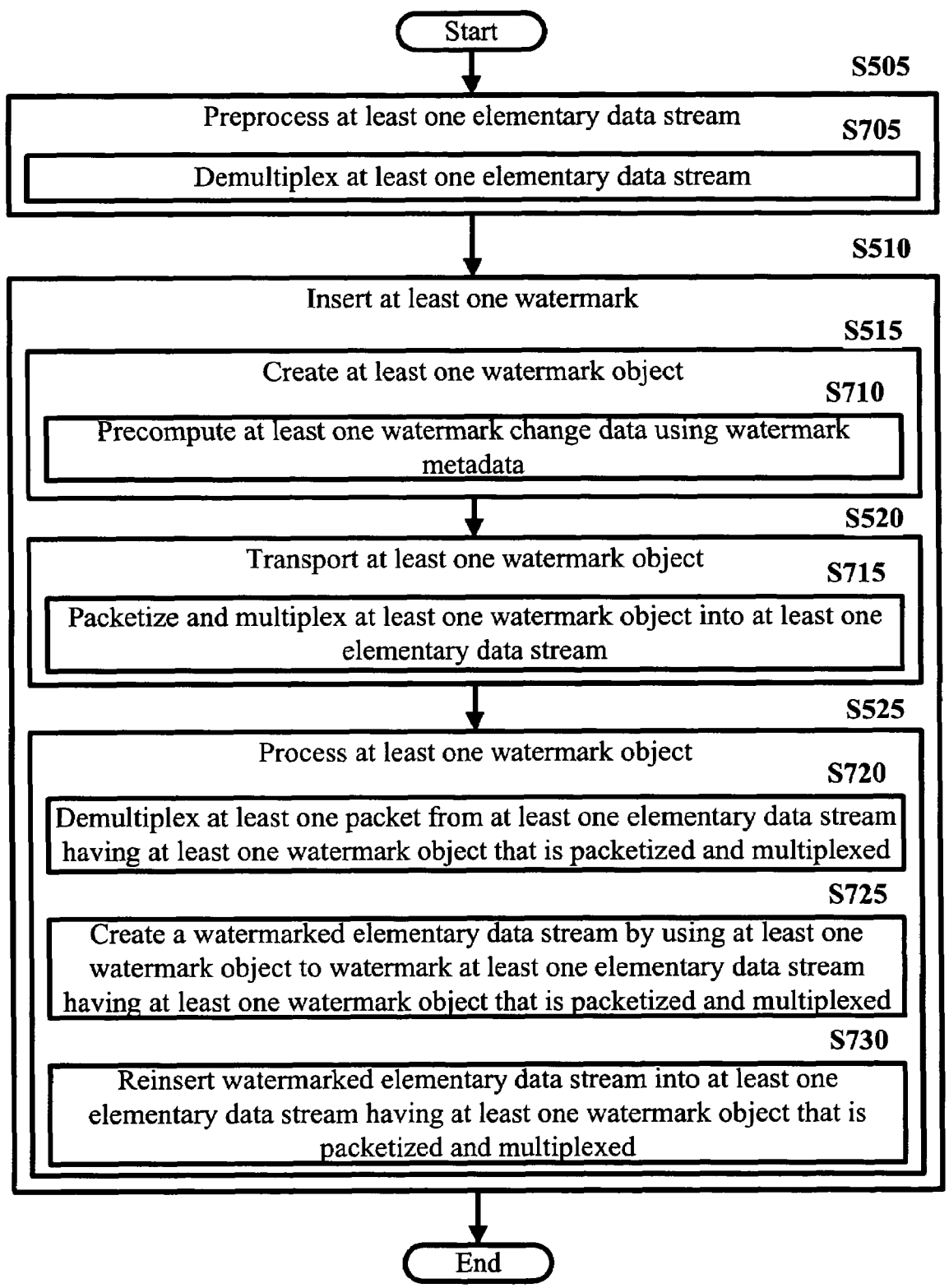
FIG. 7 shows yet another example of a flow diagram of transporting watermarked data.
Figure 8:
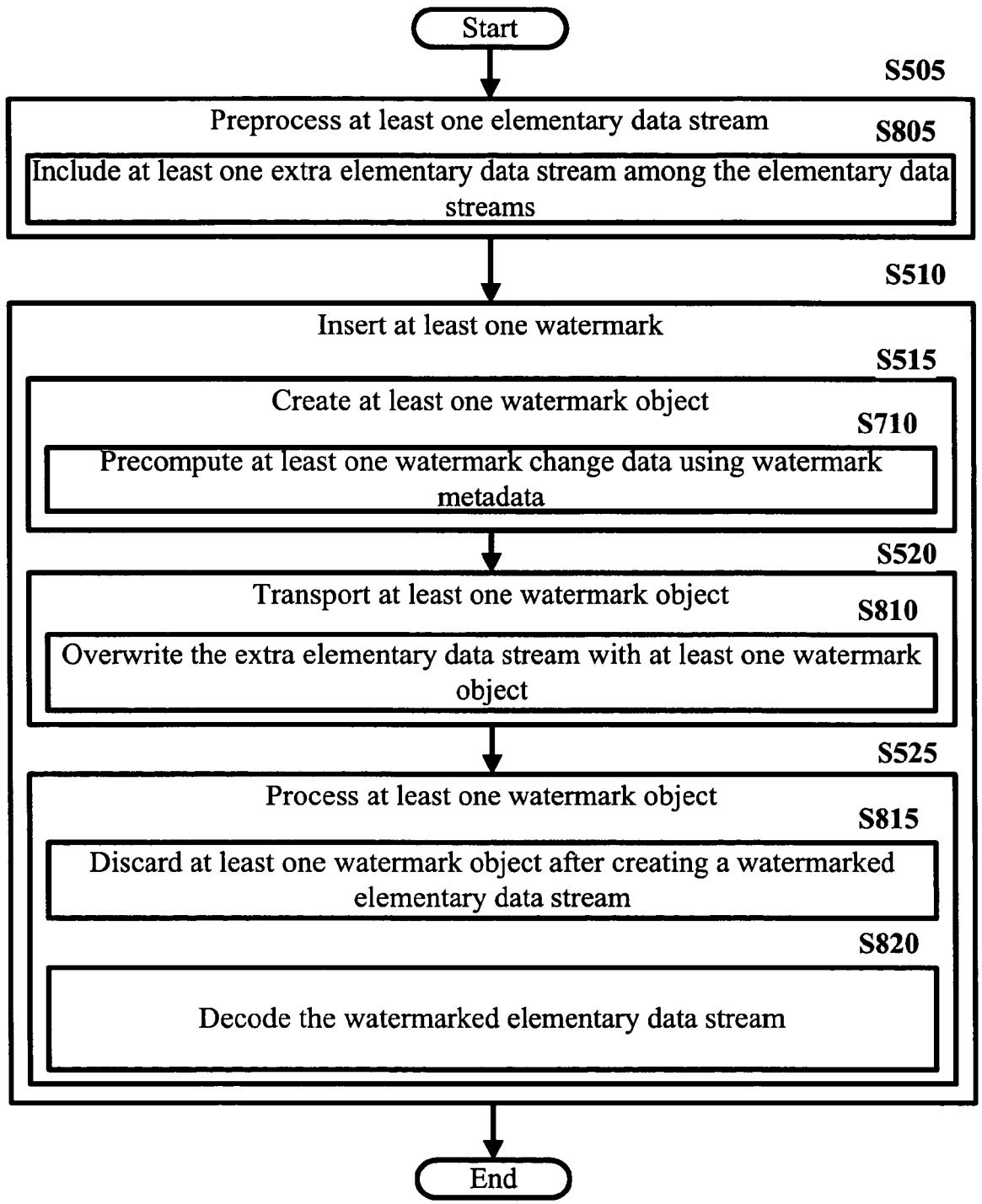
FIG. 8 shows yet another example of a flow diagram of transporting watermarked data.
Figure 9:
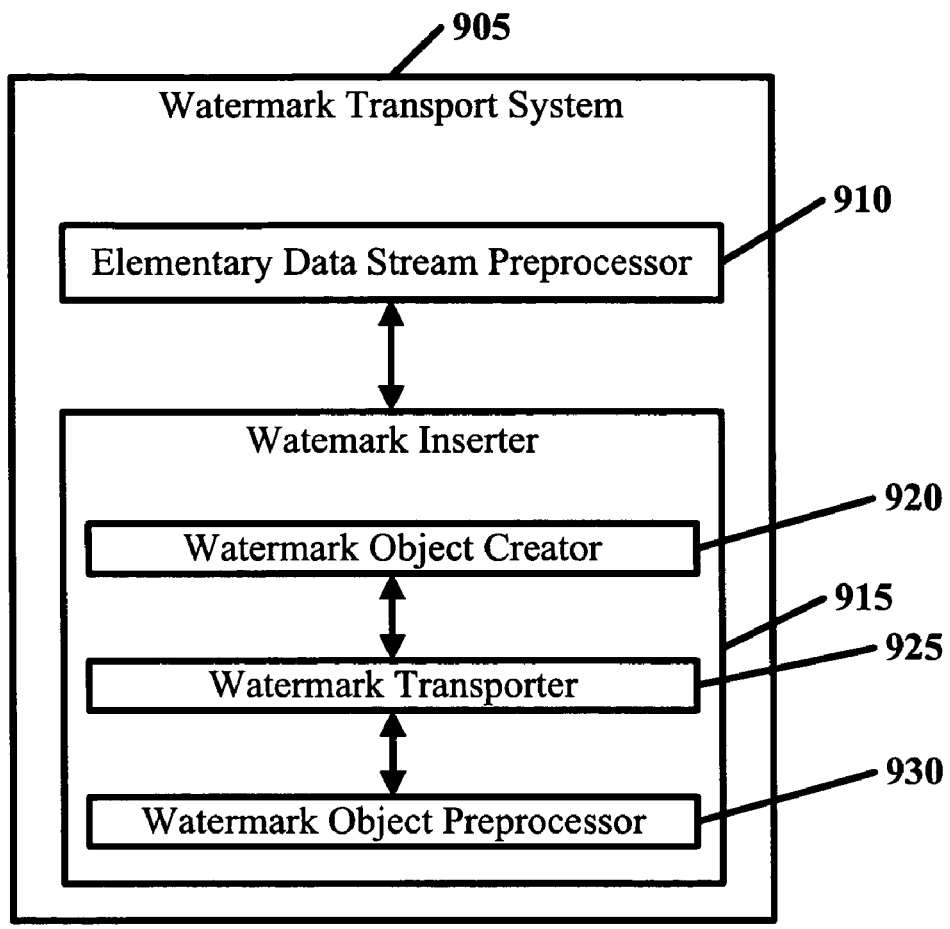
FIG. 9 shows an example of a block diagram of a watermark transport system.
Figure 10:
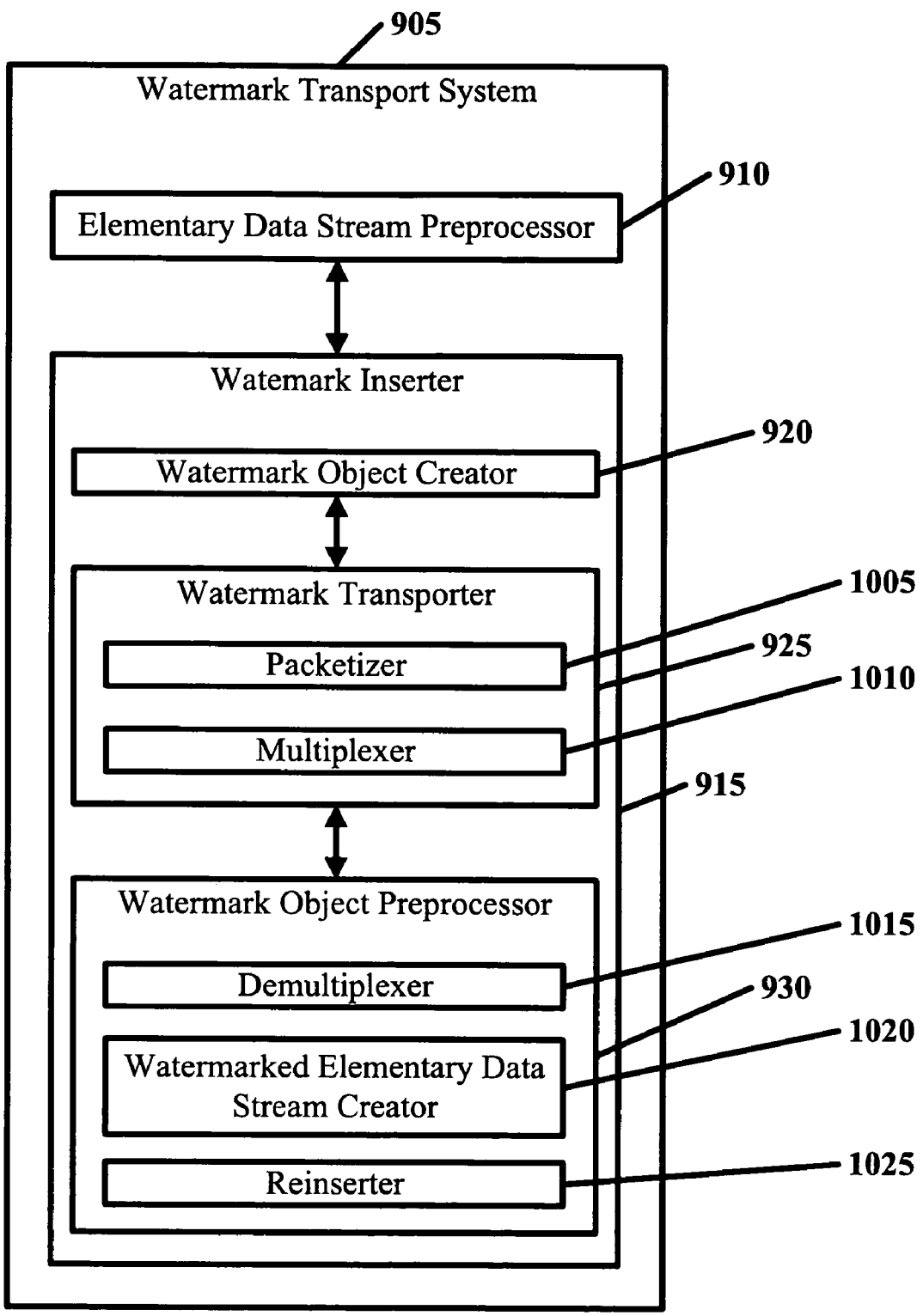
FIG. 10 shows another example of a block diagram of a watermark transport system.
Figure 11:
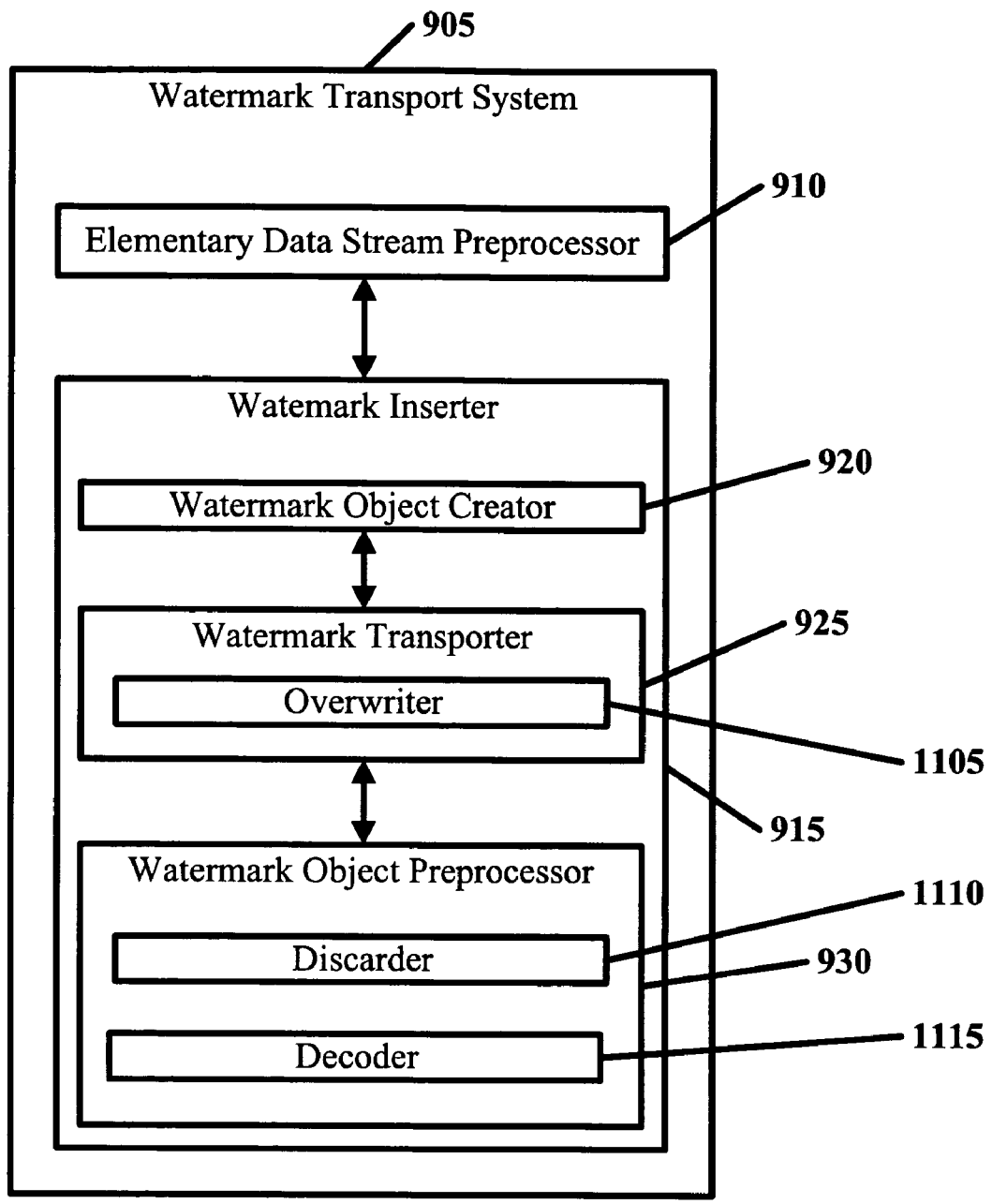
FIG. 11 shows yet another example of a block diagram of a watermark transport system.

However, for some applications, each of these changes might not be computable in real time. Thus, such applications may have to be preprocessed. The changes required to generate a 1-bit value or a 0-bit value may have to be stored and transmitted synchronously with corresponding data stream. FIG. 4 shows an example of watermark preprocessing. Here, watermarks may be preprocessed by making a precomputed change to either a compressed or uncompressed data stream.

II. The Watermark Transport System

As illustrated in FIGS. 5, 6, 7, 8, 9, 10 and 11, watermarked data may be transported (e.g., carry, synchronize and secure changes) via a watermark transport system 905. One or more elementary data streams may be preprocessed S505. Elementary data streams include, but are not limited to, audio elementary data streams, video elementary data streams, private elementary data streams, etc. Each elementary data stream may be packetized and/or nonpacketized. Examples of nonpacketized elementary data streams include AVI, Quicktime, .mov files, etc. Other elementary streams may be MPEG transport streams and MPEG program streams. Elementary data streams may or may not be part of a container stream.

Using an elementary data stream preprocessor 910, preprocessing may be accomplished in a couple of ways. One way is demultiplexing one or more elementary data streams S705. Demultiplexing may occur where more than one type of elementary data streams (e.g., audio, video, private data, etc.) exist. Another way is inserting one or more extra elementary data streams among the elementary data streams S805.

One or more watermarks may be inserted into the elementary data stream or extra elementary data stream S510. A watermark inserter 915 may be used to accomplish this feature. Watermark insertion may comprise multiple steps.

One, a watermark object may be created with a watermark object creator 920 by precomputing at least one watermark change data using watermark metadata S515, S710. The watermark object may include watermark metadata and/or watermark change data.

Two, the elementary data stream or extra elementary data stream may be watermarked with a watermark transporter 925 by transporting at least one of the watermark objects S520. Transporting may be accomplished in one of two ways.

In one way, where demultiplexing occurs, the watermark object(s) may be packetized and multiplexed, using a packetizer 1005 and multiplexer 1010, respectively, into one or more elementary data streams S715. This packetizing and multiplexing may create a transport stream. Watermarking may be synchronized with demultiplexing.

Alternatively, where the elementary data stream is only type of elementary data stream, namely video elementary date stream, is present, the extra elementary data stream may be overwritten using an overwriter 1105 with the watermark object(s) S810. In this case, individual watermark objects or slices of the watermark objects may be inserted directly into the video elementary data stream. Insertion may occur in the header or user data. After insertion, and thus creating a watermarked elementary data stream, the watermark object(s) may or may not be discarded using a discarder S815, 1110. The watermarked elementary data stream may be decoded using a decoder S820, 1115. Decoding may allow viewers to see the content that has been modified.

The watermark object(s) may be processed using a watermark object processor S525, 930.

Where packetizing and multiplexing occurs, processing may include a demultiplexer 1015 for demultiplexing at least one packet from the elementary stream having at least one watermark object that is packetized and multiplexed S720. Each packet that is demultiplexed may be stored in a buffer. Extraction of data (e.g., the watermark object) may be achieved once stored in the buffer and may be used for watermarking. It may also include a watermarked elementary data stream creator 1020 for creating a watermarked elementary data stream by using at least one watermark object to watermark at least one elementary data stream having at least one watermark object that is packetized and multiplexed S725. It may also include a reinserter 1025 for reinserting the watermarked elementary data stream back into the elementary data stream having at least one watermark object that is packetized and multiplexed S730.

Where overwriting occurs, processing may include a discarder 1110 for discarding at least one watermark object after creating a watermarked elementary data stream S815. Discarding may take place if watermarking is complete. Processing may also include a decoder 1115 for decoding the watermarked elementary data stream S820.

The elementary data stream may be stored in a container file. The container file may be transmitted to the watermark inserter.

The watermark object(s) may be stored within one or more elementary data streams S605. Storing the watermark object (s) here allow the elementary data stream to watermark itself.

Additionally, one or more buffering models may be used. Buffering models include, but are not limited to, a basic storage buffering model, a streaming buffering model and a stolen bits model.

The watermark inserter may serve as the recipient of the watermark object. When watermark object data are extracted from an elementary data stream, the data may be placed into a buffer or memory. The watermark inserter may retrieve watermark object data from this buffer or memory and process them. Processing may result in a modification of another stream (e.g., MPEG video stream), a decompressed video signal, a compressed audio stream, a decompressed audio stream or an internal set of variables of the watermark inserter. When another stream is modified, it may be reinserted into the transport stream. Reinsertion may arise in a case where, for example, the video was being watermarked at a facility where it gets retransmitted to the viewer). Alternatively, the modified stream may be directly sent to the decoder. Direct sending may arise in a case where, for example, the video was at the viewer's set top box.

The watermark inserter may modify any data stream (such as audio, video, subtitles, private data stream, etc.). Additionally, the watermark inserter may also modify a list of internal variables of a set top box. When the watermark inserter processes a watermark object, the watermark object may contain instructions to modify the behavior of the watermark inserter or the system containing the watermark inserter (e.g., the watermark engine or watermark transport system).

These instructions may be supplemental data. Supplemental data may include user data and security data. User data can be any sort of data, such as identification of the user inserting a watermark. An example of security data is revocation lists. Watermark objects may be used to carry a list of compromised set-to-box serial numbers. If the watermark inserter sees that it is running on of these compromised set-to-box serial numbers, it may automatically disable one or more functionalities. Functionalities include, for instance, high definition video playback, any video playback, etc. A way to do this would be overwriting one or more internal variables stored in memory (or system flash memory). Either the watermark transport system or watermark object may perform this overwriting function. It is well in the scope of this disclosure that either the watermark transport system or watermark object may also overwrite any data stream (e.g., elementary data stream, etc.). An effect of overwriting may permit data updates and/or software upgrades. Examples of software upgrades include, but are not limited to, watermark insertion logic, decoder logic, etc.

1. Watermark Object

To carry, synchronize and secure such changes into a container stream, a watermark object may be used. Each watermark object that corresponds to a bit of the bit string message that needs to be hidden and transmitted through the watermarked data stream has to be serialized and packaged to form a watermark elementary data stream. This watermark elementary stream has to be included in the container stream along with its corresponding elementary data stream and other present data streams. Alternatively, the watermark elementary stream has to be stored as a separate data file that may be transmitted synchronously to a watermark engine.

A watermark object is defined as a unit of information required to make a change to a data stream or an area of system memory or storage. Among this information, the watermark object may comprise watermark metadata and watermark change data. Examples of information include, but are not limited to, what needs to be changed (such as where the change is located), how big the change is, what the new values representing the change are, and under what condition(s) does the change has to be performed. It may also contain information for integrity verification and/or security features. Additionally, it may even have room to carry extra data.

The watermark object may even be wrapped into an encrypted object prior to transport. The encrypted object may comprise at least one digital certificate and at least one digital signature. Using its internal key, the watermark inserter 915 may decrypt and verify the digital certificate and digital signature. This decryption may help ensure that the watermark object is valid. Additionally, this decryption may help validate the watermark inserter.

The watermark object may be configured to be transported in a container stream. The container stream may include one or more elementary data streams. Alternatively, rather than being in a container stream, the watermark object may be configured to be transported and/or stored in the elementary data stream itself. The watermark object may be generated by preprocessing multimedia content contained in the elementary data stream.

The watermark object may comprise a header section, configuration section, security section, replacement information section and auxiliary data section. Watermark metadata and watermark change data may be located in the header section, configuration section and replacement information section.

The header section may include a watermark object identifier, a version number, an escape coding flag, a configuration section flag, a security section flag, a replacement information section flag, a replacement blocks flag and an auxiliary data section flag. Each of these flags may be 1-bit in size.

The version number may identify a watermark data stream and the format of one or more watermark objects. The watermark data stream is defined as the stream where the changes are to be made. An example of such stream is a video stream.

A watermark data stream may be changed in various locations. It may be modified directly as it is transmitted or received. Modifications may be made directly onto the watermark data stream. Examples include, but are not limited to, changing YUV pixels or Moving Picture Experts Group (MPEG) slices. Changes to the watermark data stream may also be associated with a time stamp to indicate when a change must occur. For example, as portrayed in FIG. 12, the time stamp may be used to allow the marking to occur later in time when a picture to be marked has been demultiplexed and/or decompressed.

In MPEG, time stamp usage may allow a marking to occur over a video elementary stream as it goes into the video decoder (e.g., a compressed slice of data). Alternatively, the marking may occur over a video elementary stream as it leaves the decoder to be presented for display (e.g., a series of pixels).

Figure 13:
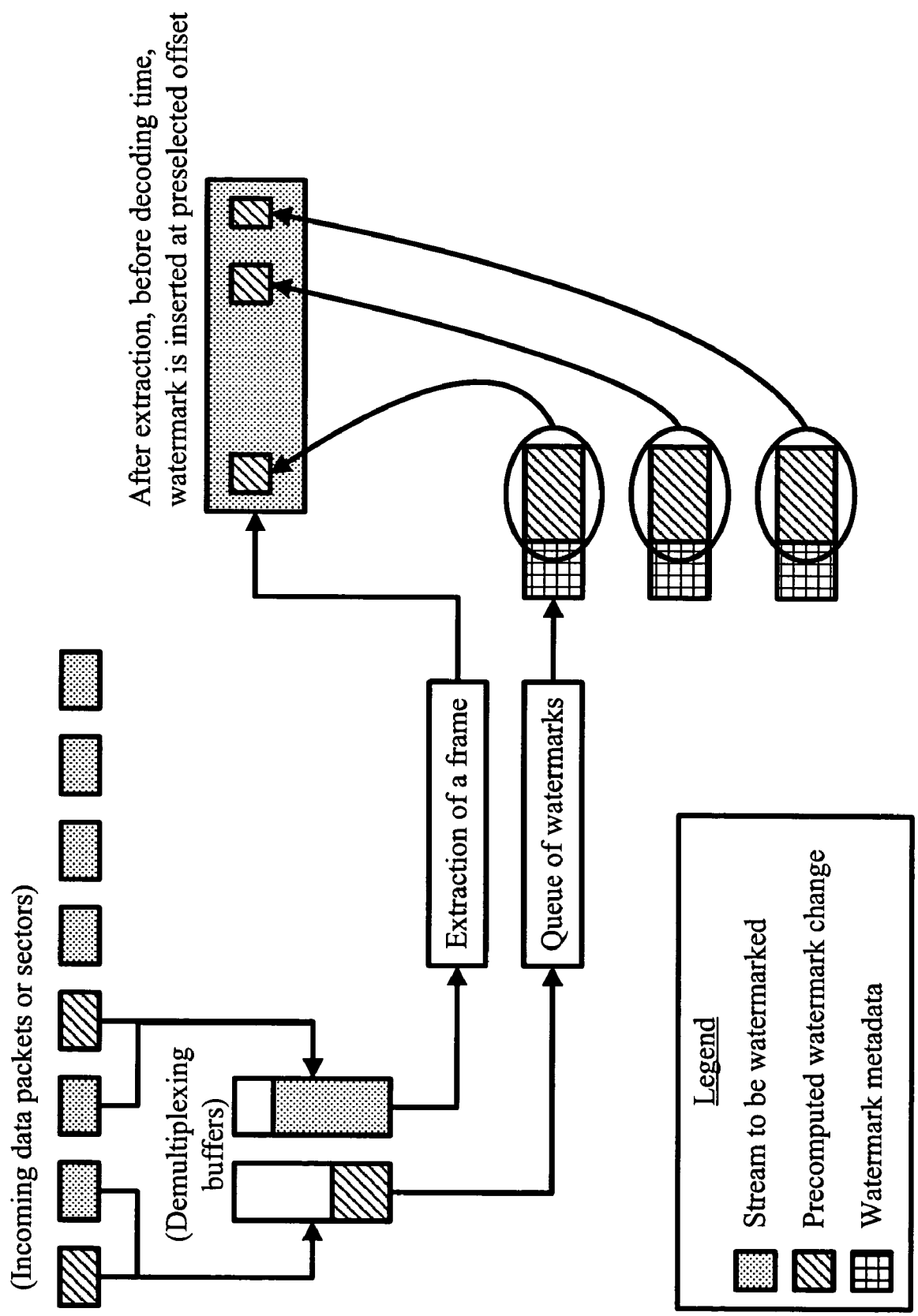
FIG. 13 shows an example of time and index based watermark insertion.

The use of time information may also help identify an area (e.g., a particular frame) that may need to be changed in combination with a relative offset to refine the location of the change. To illustrate this feature, FIG. 13 shows an embodiment of time and index based watermark insertion.

Figure 14:
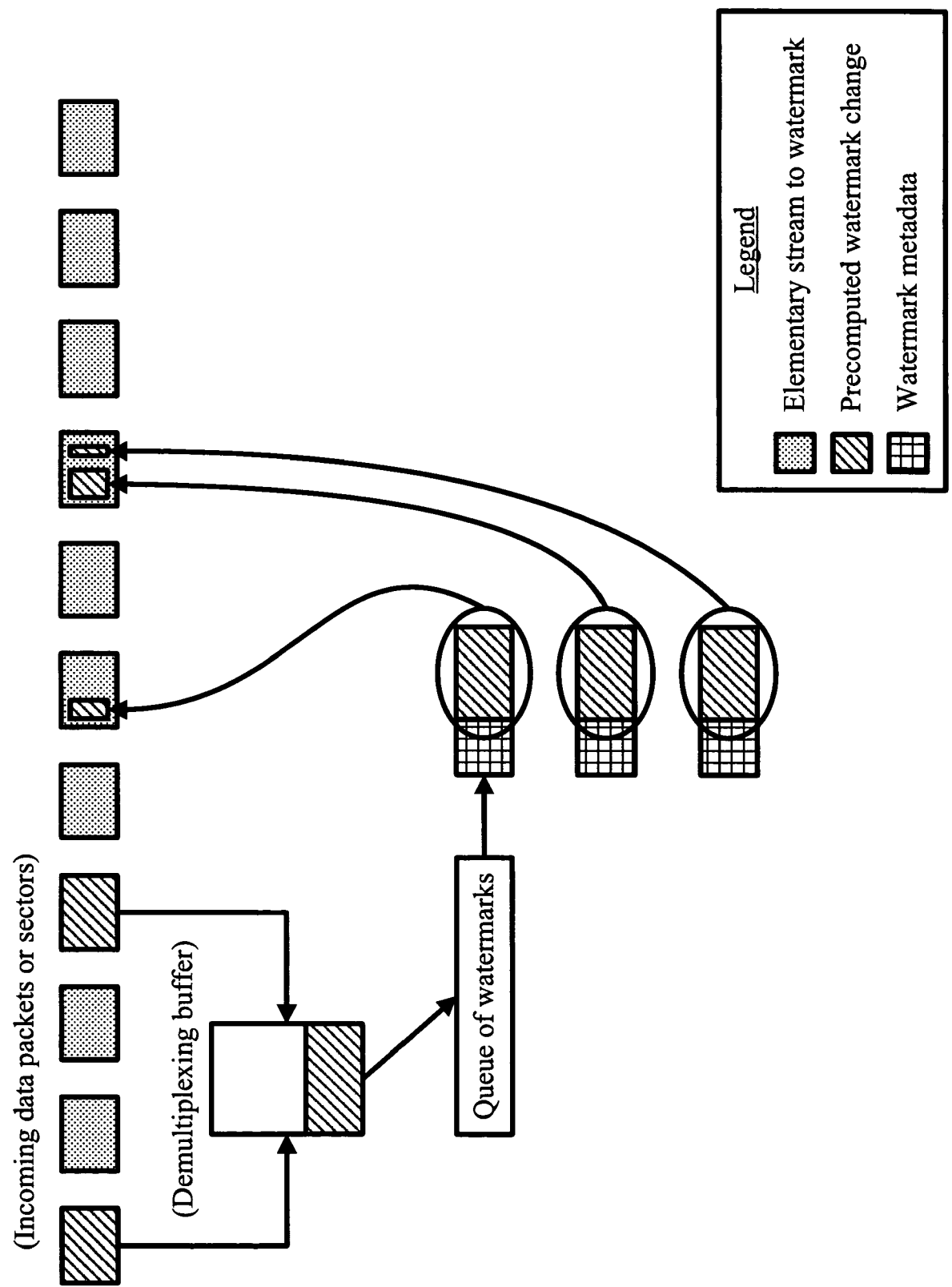
FIG. 14 shows an example of index based watermark insertion.

Another method of specifying the location of the change is using a physical number. Examples include, but are not limited to, a sector number in a DVD application, a program ID in one or more transport streams and a frame counter in a video stream. Any physical number may be used in combination with an offset and/or time stamp to refine the exact location of the change. This index based watermark insertion method is illustrated in FIG. 14.

Figure 15:
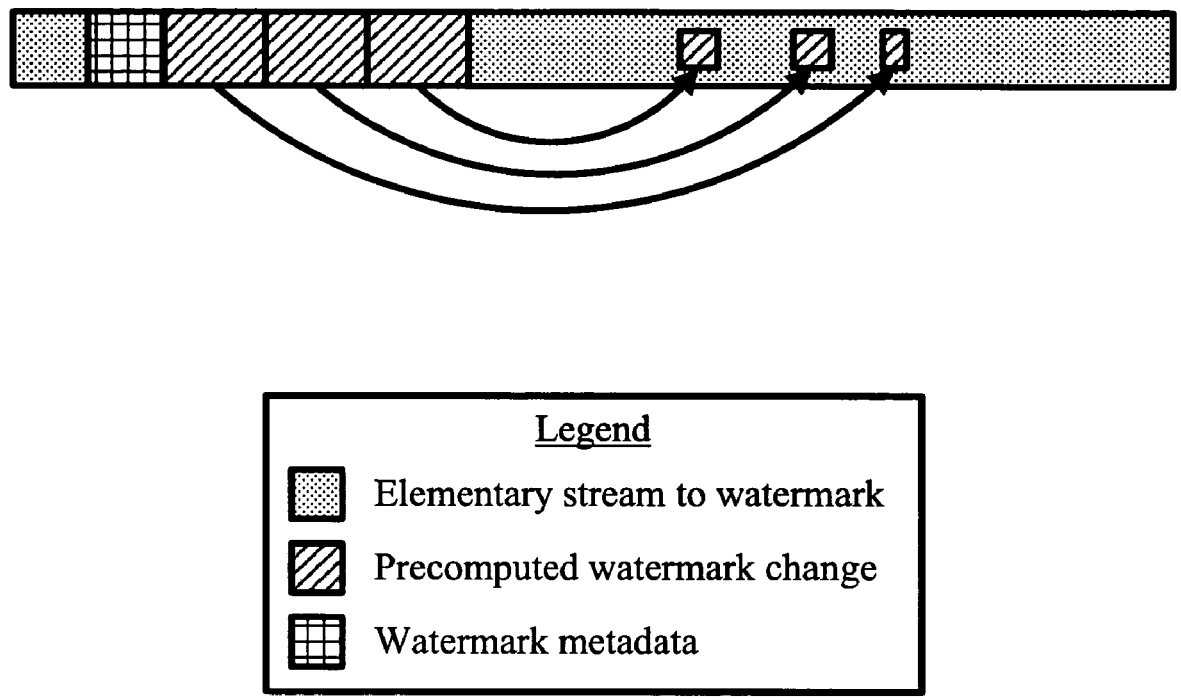
FIG. 15 shows an example of low level watermark embedding.

When the watermark object is stored with the object it applies to, only a relative offset may be required. Such low level watermark embedding is shown in FIG. 15. In this example, the watermark object may be transported individually for storage.

The escape coding flag may indicate that a watermark object has been encoded using a generic synchronization code prevention algorithm. This prevention code may be referred to as "escape coding." It may be necessary to replace an array of variable length byte sequences when one or more sequences appear in the watermark object. The goal is to be able to avoid the generation of codes that may be reserved in the bit stream. An example of such codes is start codes for MPEG. If an MPEG start code, such as "00 00 01", were to be generated, it would have been replaced by "00 00 02 01". In essence, "00 00 02 02" by "00 00 02" (which may be used as a base to create the escape code) and so on. Hence, this kind of avoidance is favored.

The configuration section may include a size data (e.g., the number of bytes in this section) and a setup data (e.g., information such as profile, levels, etc.) This section is designed to mimic the purpose of the sequence headers in MPEG video elementary stream. It must be presented at the beginning of a stream. However, its frequency of appearance in the stream may be predefined according to various profiles and levels of usage of the watermark objects.

The security section may include a size data (e.g., the number of bytes in this section), a watermark object quantity and a checksum of this watermark object. The watermark object quantity may be used for identifying the number of watermark objects (including this one) a checksum covers. The checksum may include at least one digital certificate and at least one digital signature field. This section may even contain the checksum of several upcoming watermark objects. Simply, this section is a container that may store required security related fields.

The replacement information section is the core of the watermark object. In general, replacement information may be coded according to a time base and/or physical location. This information may include a replacement mode, which may have a size of 2-bits. Additionally, replacement information may include, inter alia, a pre-decompression flag/indicator, post-decompression flag/indicator, a physical reference flag/indicator, a time stamp reference flag/indicator, a compressed bit index flag/indicator, a compressed physical reference flag/indicator, a compressed time stamp reference flag/indicator, a physical reference, a time stamp reference and one or more replacement data blocks. Each of these may be 1-bit in size.

Optionally, a bit index may be included in the replacement information. However, the bit index is not necessary if the replacement mode has a 0-bit or 1-bit value.

The replacement mode field defines the kind of replacement that may occur for a particular watermark object. The field may be used for debugging. However, the field may also be used to provide extra features, such as multiple message insertion and playback intervention.

The replacement mode may be defined in 4 modes as follows: 0—skip the replacement altogether; 1—always perform the replacement; 2—use the bit index field to detect whether it is necessary to perform the replacement; and 3—use the bit index field to detect whether replacement needs to be performed when using multiple messages. Since the bit index may be used only in modes 2 and 3, it is not stored for modes 0 and 1.

The pre-decompression/post-decompression flag indicates if the marking must occur after/before decompression of the target watermark object.

The physical reference field allows the identification of the target watermark object by program ID or by sector number. This reference is an optional programmable field that helps in identification.

Using time stamp information, the time stamp reference field may allow the identification of the target watermark object. This field's usage may differ depending on the content of the post-decompression/pre-decompression flag. For example, in MPEG, the time stamp reference field may be used to hold a video Decoding Time Stamp (DTS) or presentation time stamp (PTS).

Replacement data blocks are an array of local replacements. These blocks contain watermark replacement data, and may comprise a multitude of information. Information may include a replacement block flag/indicator signaling a last replacement block or more to follow, a data replacement checksum flag/indicator signaling the checksum of "bytes of data to be replaced," a relative replacement offset, a replacement byte quantity (for identifying the number of bytes to replace) and a new byte quantity (for identifying bytes of data that need to be written). Optionally, at least one replacement data checksum (e.g., the checksum of bytes of data to be replaced) may also be included in a replacement data block. The replacement data checksum may comprise at least one digital certificate and at least one digital signature field. Each flag/indicator may be 1-bit in size. The relative replacement offset may be accumulated.

Multiple replacements may be present. Each replacement may have a relative differentially coded offset to allow a compact list of replacements. An example where more than one replacement may be required for the same watermark is uncompressed video streams. In these streams, N pixels of a row must be replaced. Once achieved, N pixels of the next row must be replaced. This replacement may continue repetitively until N pixels of each row have been replaced.

Auxiliary data in the auxiliary data section may be used to carry a size data (e.g,. byte size) and an extension auxiliary data quantity (e.g., the size of any extra component). Also, auxiliary data may carry additional security features, such as at least one digital certificate and at least one digital signature. Furthermore, auxiliary data may be used to expand the structure in the future while preserving backward compatibility.

2. Watermark Elementary Data Stream

Figure 12:
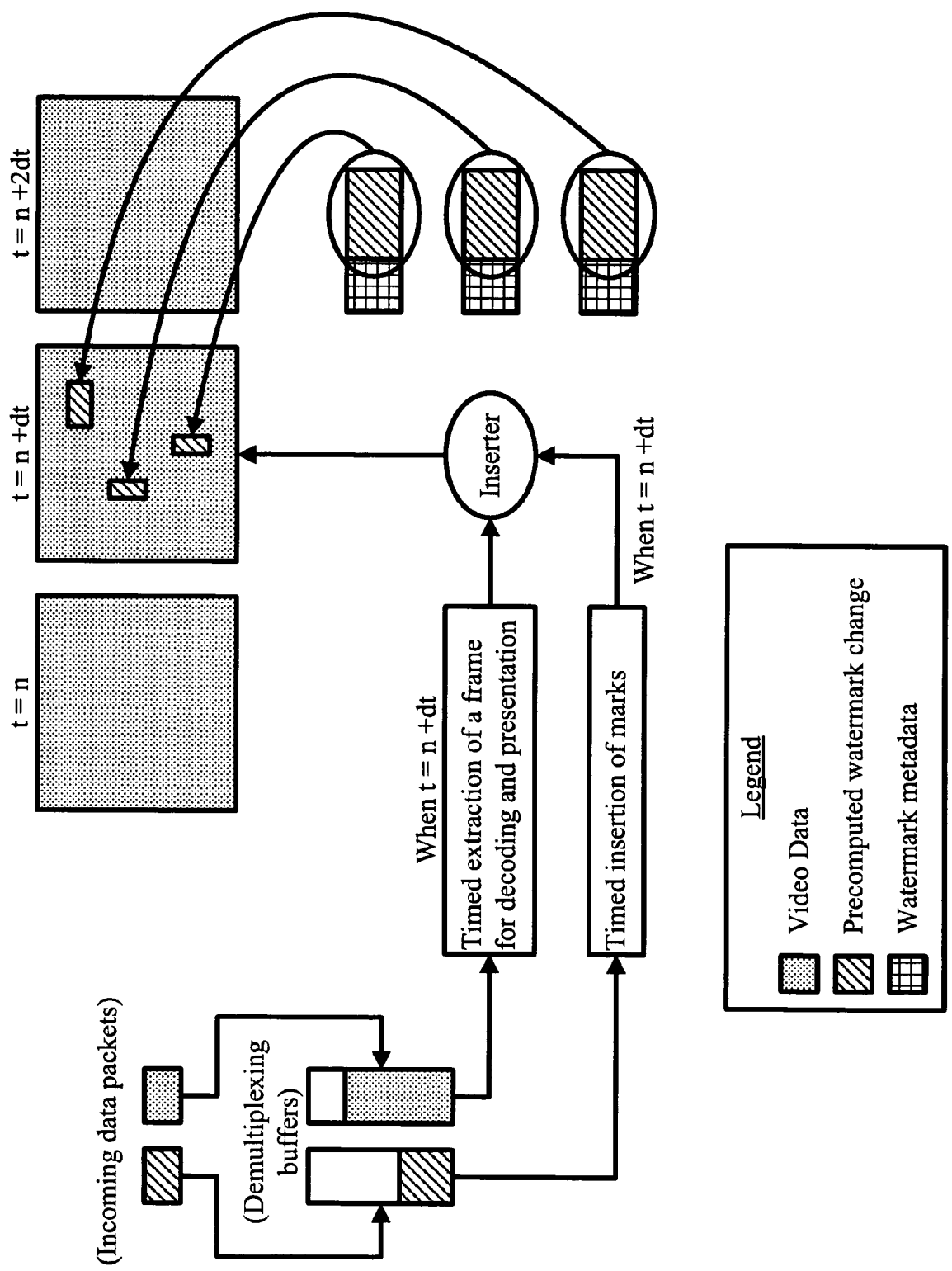
FIG. 12 shows an example of a timestamped watermark insertion, which may permit the marking of a stream after it has been demultiplexed and/or decompressed.
Figure 16:
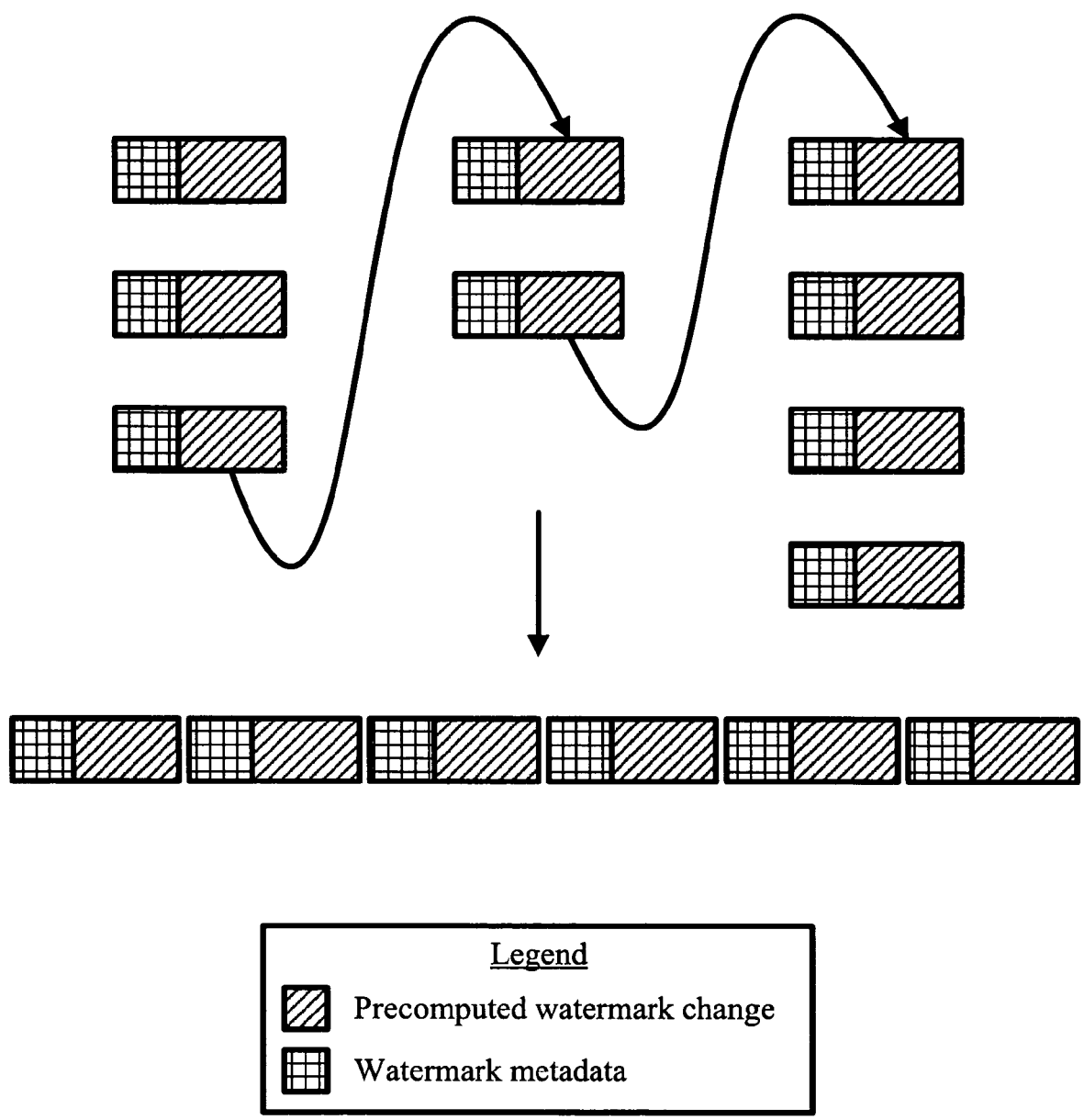
FIG. 16 shows an example of combining watermark objects to form a watermark stream.

Watermark objects may be transported in a couple of ways. One way is individually, as objects. For example, as illustrated in FIG. 15, complete watermark objects are stored or embedded at a low level in the stream near the area they apply to. Another way is transportation as a continuous stream. For instance, as shown in FIGS. 12 and 13, watermark objects may be combined to form a watermark stream that is similar to how compressed audio frames are often combined to form an audio stream, such as Dolby Digital audio streams. This combination is illustrated in FIG. 16. Both these transportation methods may be used with buffering models.

3. Fragmentation of Objects

Packetization of data streams for transport or storage may result in fragmentation of elementary streams during transport or storage. Watermarking a fragmented of packetized data stream may be problematic. What would have been a unique watermark object may have to be changed to a multitude of smaller watermark objects to perform the same or similar replacement. A resolution to such problem is to mark the elementary data streams after they have been demultiplexed from the container stream. This resolution may be achieved by including one or more synchronization methods (e.g., timestamp information) in watermarking. Keeping watermarking in sync with demultiplexing elementary data streams (e.g., audio, video, etc.) may help prevent the fragmentation problem above.

If the data stream needs to be watermarked before the final demultiplexing, it may be useful to implement a stream extractor and a stream reinserter to perform the equivalent of demultiplexing. The extra logic involved in this process may result in large bandwidth savings in streams, where packet sizes may be small (e.g., MPEG-2 transport streams with 188 byte packets). For data streams with larger packet payloads, where, for example, packetization may be performed at a video or audio frame level, the extra demultiplexing and/or reinsertion logic may not be necessary.

4. Watermark Setup and Modes

Various methods of transport and storage or watermark objects herein may be grouped in predefined sets of profiles and levels to allow various implementations to support a subset of functionalities defined. Certain limits to each functionality (such as bit rate limits) may also be supported. Configuration parameters for these methods may include: message bit mapping, delta coding, time stamping, generic synchronization code prevention (escape coding) engine, special version(s) of watermark objects, and error recovery mode.

In message bit mapping, each watermark object may contain a bit index to identify the bit of the corresponding binary message. The index mapping into the binary message does not have to be a 1 to 1 relationship. Having multiple types of relationships may allow for multiple watermark messages to be inserted into a movie at different points in time.

Some of the fields of the watermark object may be delta coded to reduce storage requirements. Typically, the difference with the previous value may be stored. The word size of a reduced field may vary to accommodate for different stream requirements. If the replacements are close to each other, small delta-coded offsets (e.g., 10 bit delta-coded offsets) may be sufficient. However, if the replacements are further apart from each other (e.g., uncompressed video frame), larger delta-coded offsets (e.g., 16 bit delta-coded offsets) may be needed. Exceptions may also be allowed. For example, if the word size is not enough to code the difference, the absolute value may be refreshed, or an empty (e.g., no replacement) watermark object may be inserted.

A time stamp may be used to locate the watermark insertion point. When used, the reference field usage (e.g., a DTS/PTS or a frame count) may need to be indicated. This indication may be achieved using levels and profiles.

The uses of the generic synchronization code prevention (escape coding) engine may also be grouped in classes. An example of a class is a 3 byte sequence, such as 0x00 0x00 0x01. If a class does not appear in the user data section of a data (e.g., MPEG) stream, the class may be specified either in the configuration section of a watermark object. Alternatively, the class may be made known in advance for various profiles and levels that require it.

One or more special versions of watermark objects may be created for specific profiles to include marker bits. The creation may help prevent the appearance of reserved codes in headers to facilitate their decoding. It is important to note that such creation may not be strictly required because the delta coding and/or escape coding method may cover the headers of the watermark objects as well.

Various error recovery methods may be used. Examples include, but are not limited to, best effort insertion, zero tolerance (e.g., abort on any single error), watermark stream bit rate monitoring, watermark object rate monitoring, etc. Error recovery mode may be known in advance for each profile and/or level. It may also be stored in a configuration section or be hard coded in the inserter engine.

5. Buffing Model

The watermark transport system may support three different buffing models. These models are the basic storage buffering model, streaming buffering model and "stolen bits" model.

i. Basic Storage Buffering Model

Figure 17:
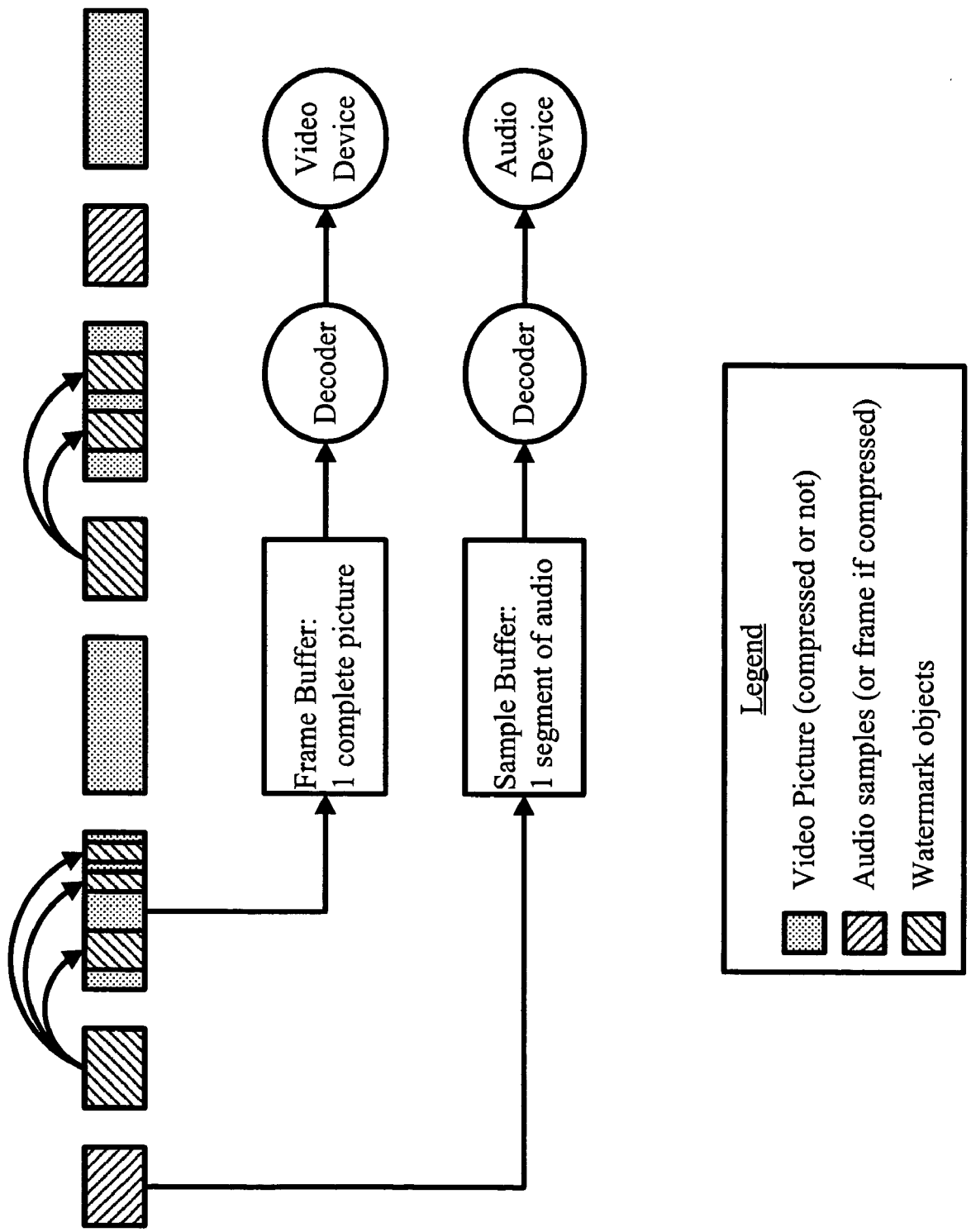
FIG. 17 shows an example of a basic storage buffering model.

The basic storage buffering model may be used for container streams without explicit timing information or "leaky bucket" transmission buffers. FIG. 17 shows an example of the basic storage buffering model. Each watermark object (or elements of the watermark elementary data stream) may be stored where it may be needed. Storage may occur near the object that the watermark object applies to. Since it is sometimes difficult to predict the amount of watermark data that may be needed for each watermarked object, typically the container stream may have to be rewritten to include extra data required for watermarking. Rewriting may not be necessary if this information is available when the container stream is created.

ii. Streaming Buffering Model

Figure 18:
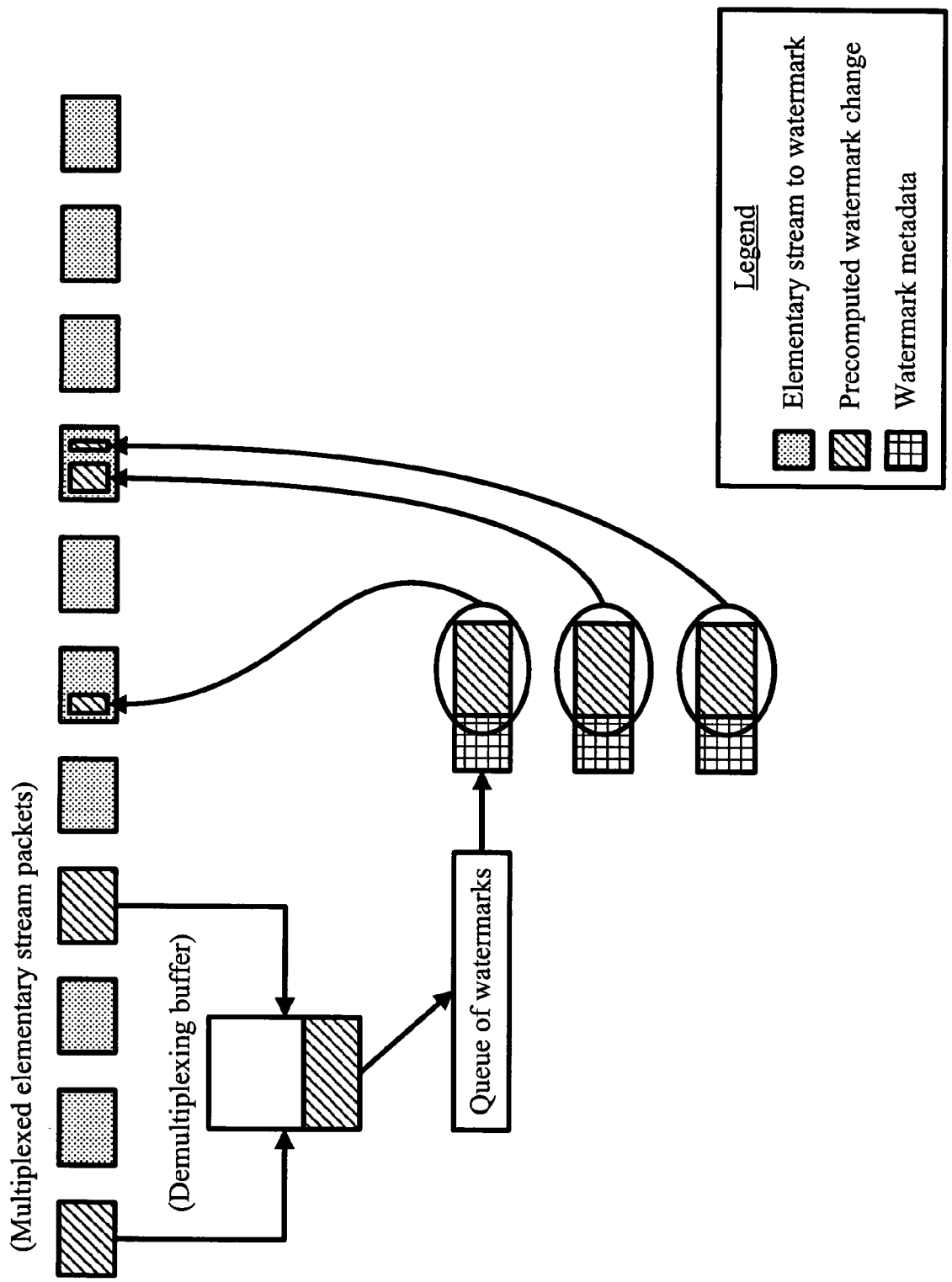
FIG. 18 shows an example of an elementary data stream buffering model.

The streaming buffering model may be used for container streams with explicit timing information and/or "leaky bucket" transmission buffers. FIG. 18 shows an example of the streaming buffering model. A specific watermark elementary data stream may be multiplexed into the stream and may follow a buffering model similar to other data streams. With this model, the watermark elementary data stream may be multiplexed beforehand during stream generation when it is known. Alternatively, room may be reserved at a predefined data rate. A user defined stream may be inserted for a later update. If user defined elementary data stream is not available in the multiplexing engine, a different stream may be inserted (such as an audio stream). This different stream may be later converted to a watermark elementary data stream, provided it adheres to the same buffering model.

iii. "Stolen Bits" Model

Figure 19:
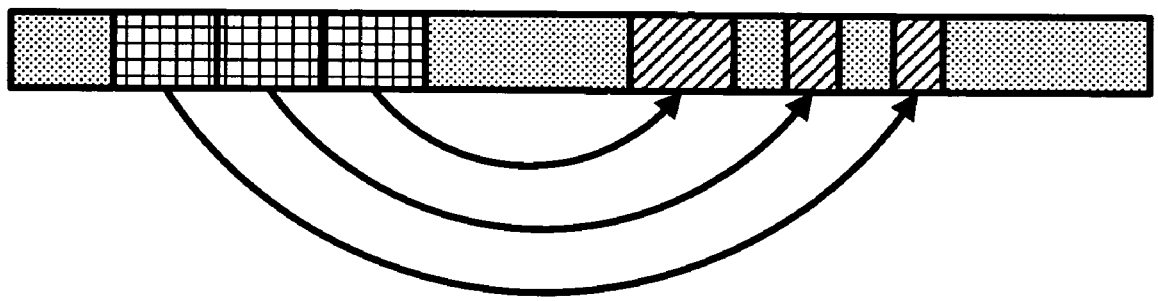
FIG. 19 shows an example of using MPEG elementary video user data to store watermark objects.
Figure 20:
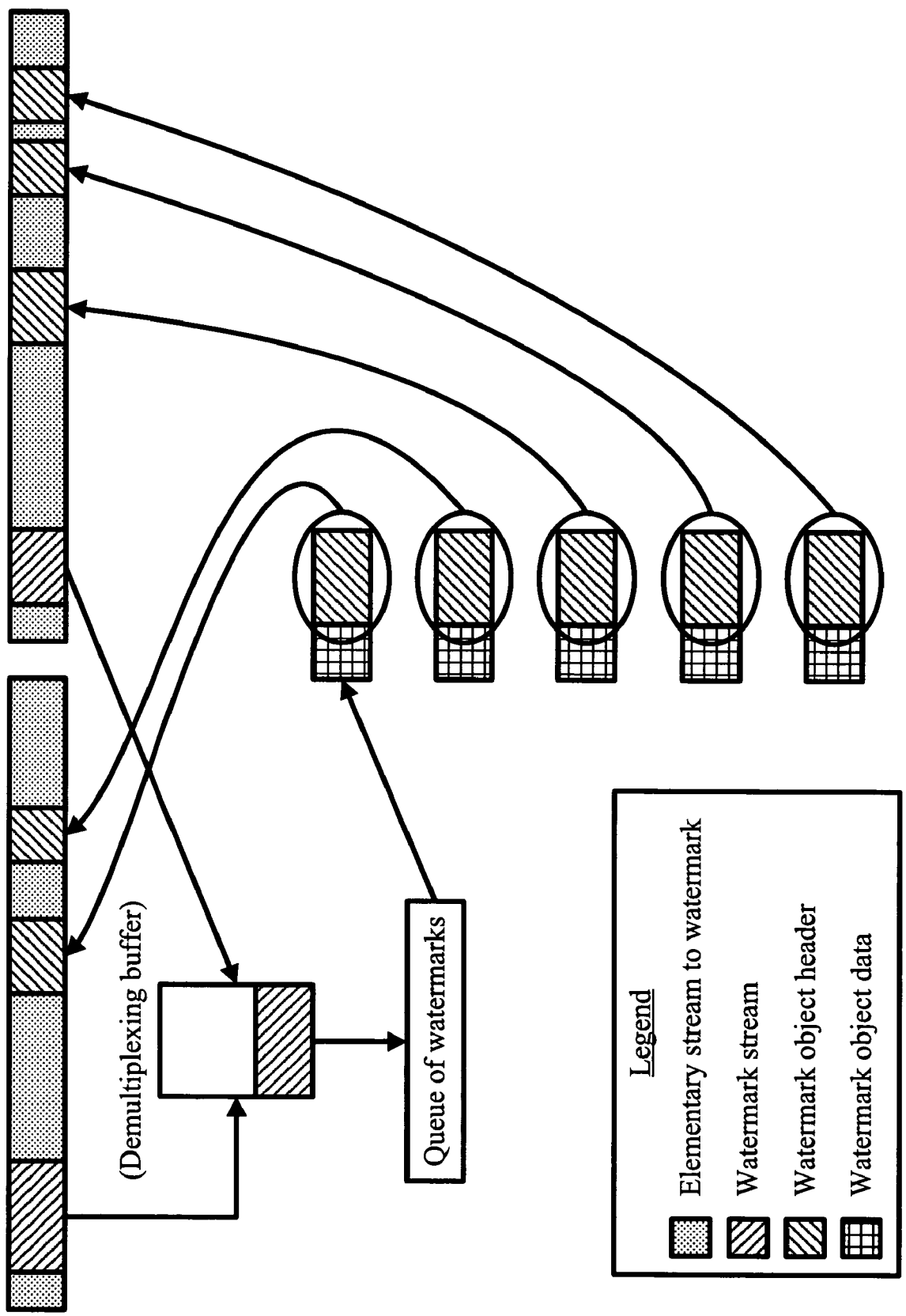
FIG. 20 shows an example of using MPEG elementary video user data to store a watermark stream.

In cases where a standalone watermark elementary data stream cannot be included in the container stream, it may be possible to embed pieces of watermark elementary data stream or complete watermark objects into the elementary stream to be watermarked. FIG. 19 shows an example of the "stolen bits" model, where MPEG elementary video user data may be used to store watermark objects. FIG. 20 shows another example of the "stolen bits" model, where MPEG elementary video user data may be used to store a watermark stream.

The bandwidth required to carry watermark objects may be taken from the bandwidth of the watermarked elementary stream. This taking may increase the bandwidth average and peak bit rates. Alternatively, it may reduce the watermarked stream data rate to include room for the watermark data stream. Such model may accommodate both the basic storage buffering model and streaming buffering model since this bandwidth may be used both ways. Differences among these models involve where the watermark elementary stream or objects are stored.

Figure 21:
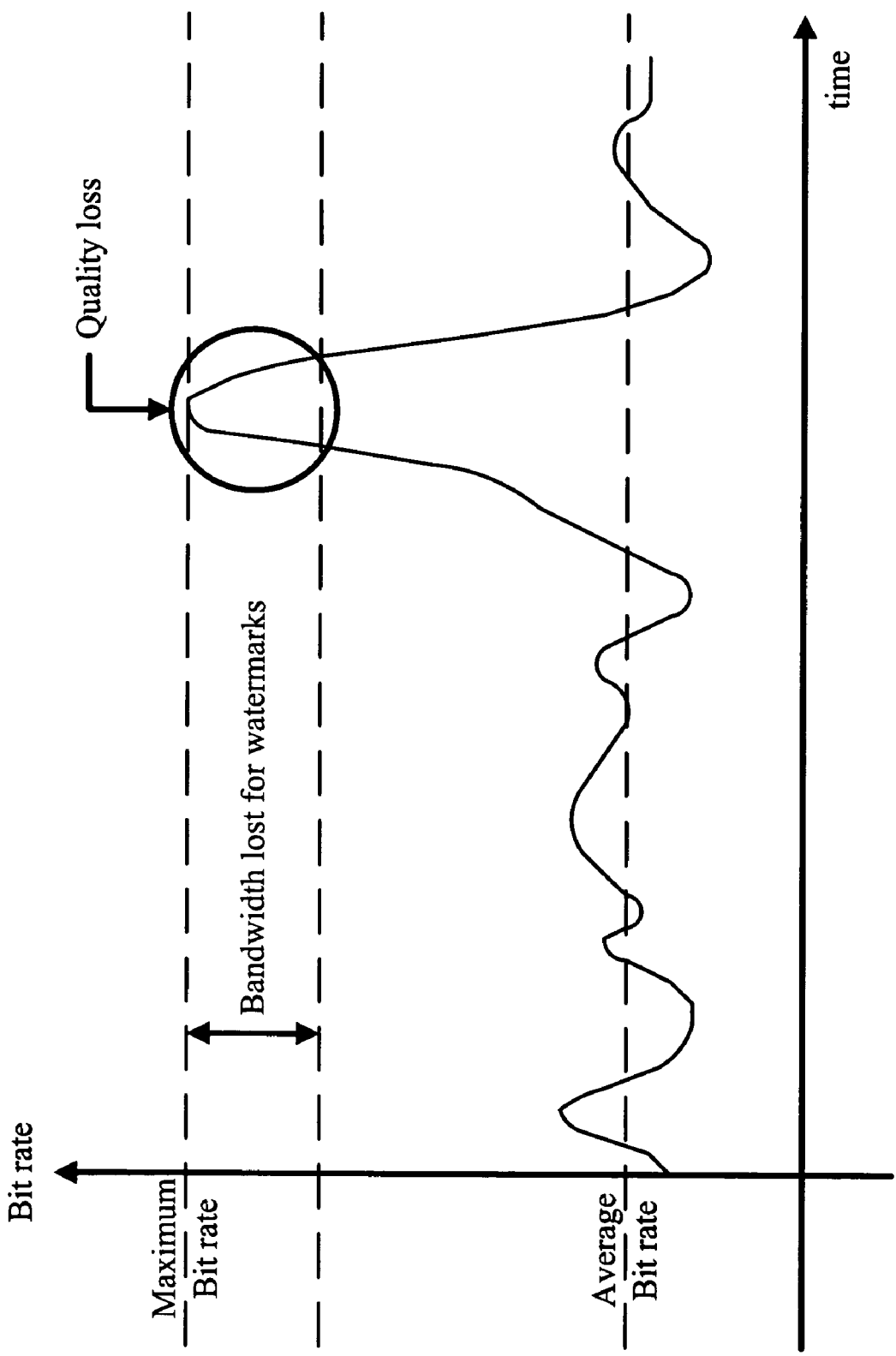
FIG. 21 shows an example of the impact on the elementary stream bandwidth when elementary user data is used to store watermark data.
Figure 22:
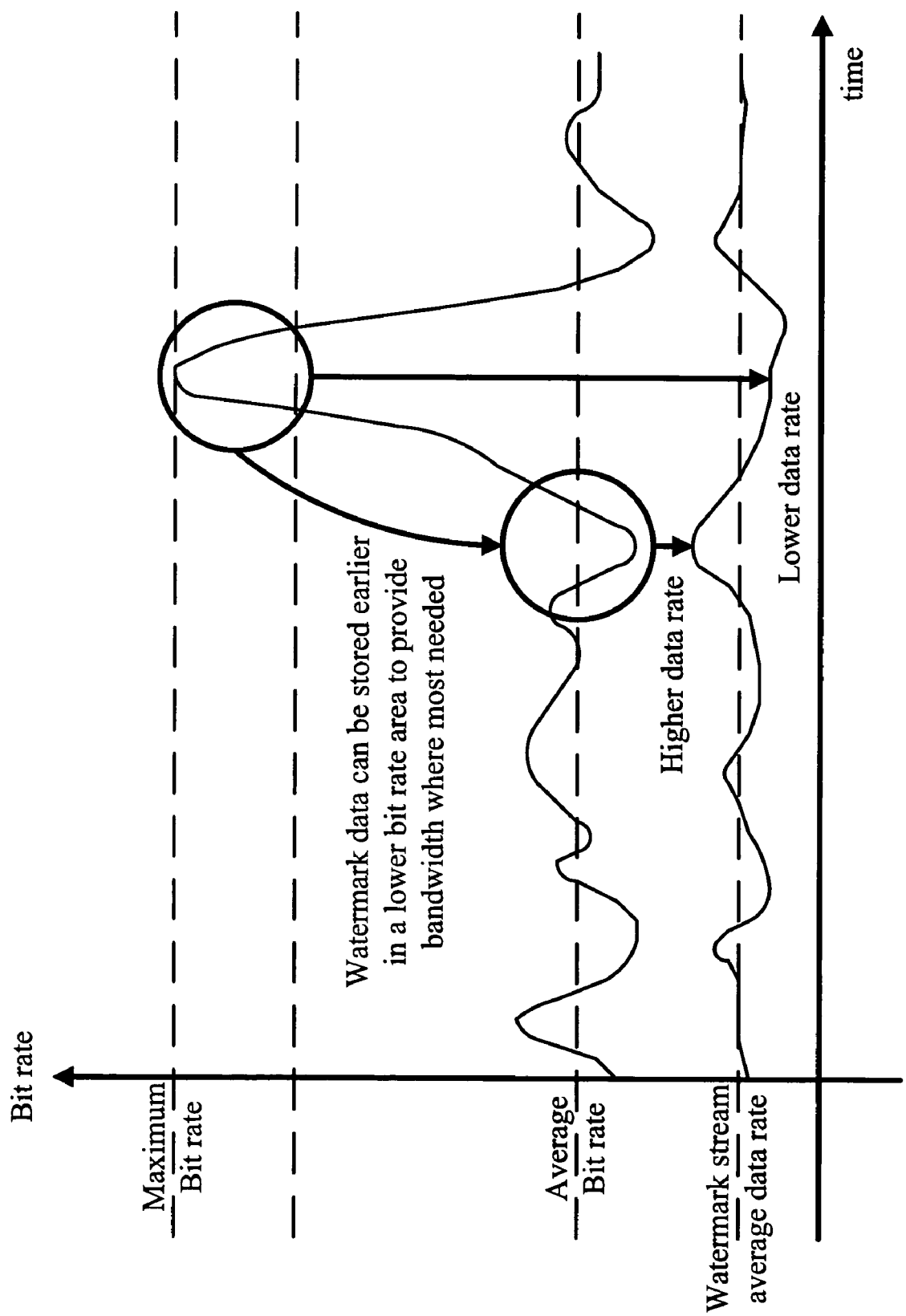
FIG. 22 shows an example of minimizing the impact on the bandwidth when separate user data is used to store watermark data.

The use of elementary user data to store watermark data may have an impact on bandwidth. This impact may be illustrated as in FIG. 21. The peak bit rate may be not achieved because data is needed to store watermarks. However, when watermark data is carried in a separate data stream, as shown in FIG. 22, the impact on bandwidth may be minimized. In essence, the use of a buffering model may allow advance buffering of watermark objects to reserve peak bandwidth where needed.

III. Bandwidth Management and Backward Compatibility

1. Watermark Stream Encapsulation

If an implementation allows for the use of a new, specific stream type or does not offer a user data and/or metadata streams that can be used to carry the watermark data, a watermark data stream may be encapsulated into a new data stream of a different type. For example, an MPEG video elementary stream may provide support for user data packets. An artificial MPEG video stream (e.g., MPEG-1, MPEG-2, MPEG-4 AVC, etc.) may be created. The artificial MPEG video stream may include headers with user data packets containing watermark packets. Such stream may be transported and processed as a regular video stream. The tools already developed to manipulate the data streams may see the new stream as an alternate video stream. For instance, the alternate video stream may appear to be a new video angle or a separate video channel. Another example is Dolby AC3 elementary data streams, which may provide room for auxiliary data at the end of each frame. The Dolby AC3 elementary data streams may be used to carry watermark data instead of audio, while keeping the audio headers and making the stream appear as a regular audio stream.

2. Watermark Stream Masquerading

Similar to the stream encapsulation method, if none of the elementary data stream types have provisions to carry extra data, a watermark data stream may be masqueraded as a different data stream. Artificial headers may be added around a packetized watermark data stream to make it look like a supported data stream, but containing watermark data. The stream would probably not be decodable. However, an authoring software (e.g., Sonic Senarist, Apple DVD Studio Pro, etc.) may still be able to parse it and treat it as a read-only elementary stream of an already known type.

3. Watermark Stream Low Level Embedding

If implementation restrictions forbid the use of an extra data stream, the watermark data stream may be embedded within the elementary data stream if the watermark data stream is related to the elementary data stream. Yet, for embedding to occur, it may be necessary for the watermark data stream to provide a means to embed extra user data. However, embedding may use bandwidth from an already defined elementary stream. This use may require a re-multiplexing of interleaved container streams that follow a buffer and timing management model. Additionally, this use may require a re-adjustment of packet sizes of other container streams, with decoder buffers potentially overflowing. As a way to prevent these overflows, one may reduce the peak bit rate allowed by the elementary stream that will embed the watermark. It may be the case the audiovisual quality may degrade from this reduction.

4. Bandwidth and Buffering Models

Typically, MPEG transport stream generators may allow for the insertion of an extra user data stream (such as Broadcom BCM7040) so that room may be reserved for watermark data preparation. When a specific user data block cannot be reserved, an alternate solution may be to include an extra stream (e.g., an audio stream) that may be later converted to a watermark data stream or to a masqueraded watermark data stream.

In the case of low level embedding, the required bandwidth may be "stolen" when recompression of the watermarked data stream is possible and audiovisual quality can be degraded. In the degradation process, the watermarked data stream may be recompressed to provide room for watermark data. The required bandwidth can also be "prepared" for embedding by intentionally increasing the watermarked stream data rate to prepare for a later recompression to allow for a greater audiovisual quality. Furthermore, the required bandwidth may be "reserved" by adding a fixed padding to the watermarked data stream that can be reused and converted to watermark data.

Figure 23:
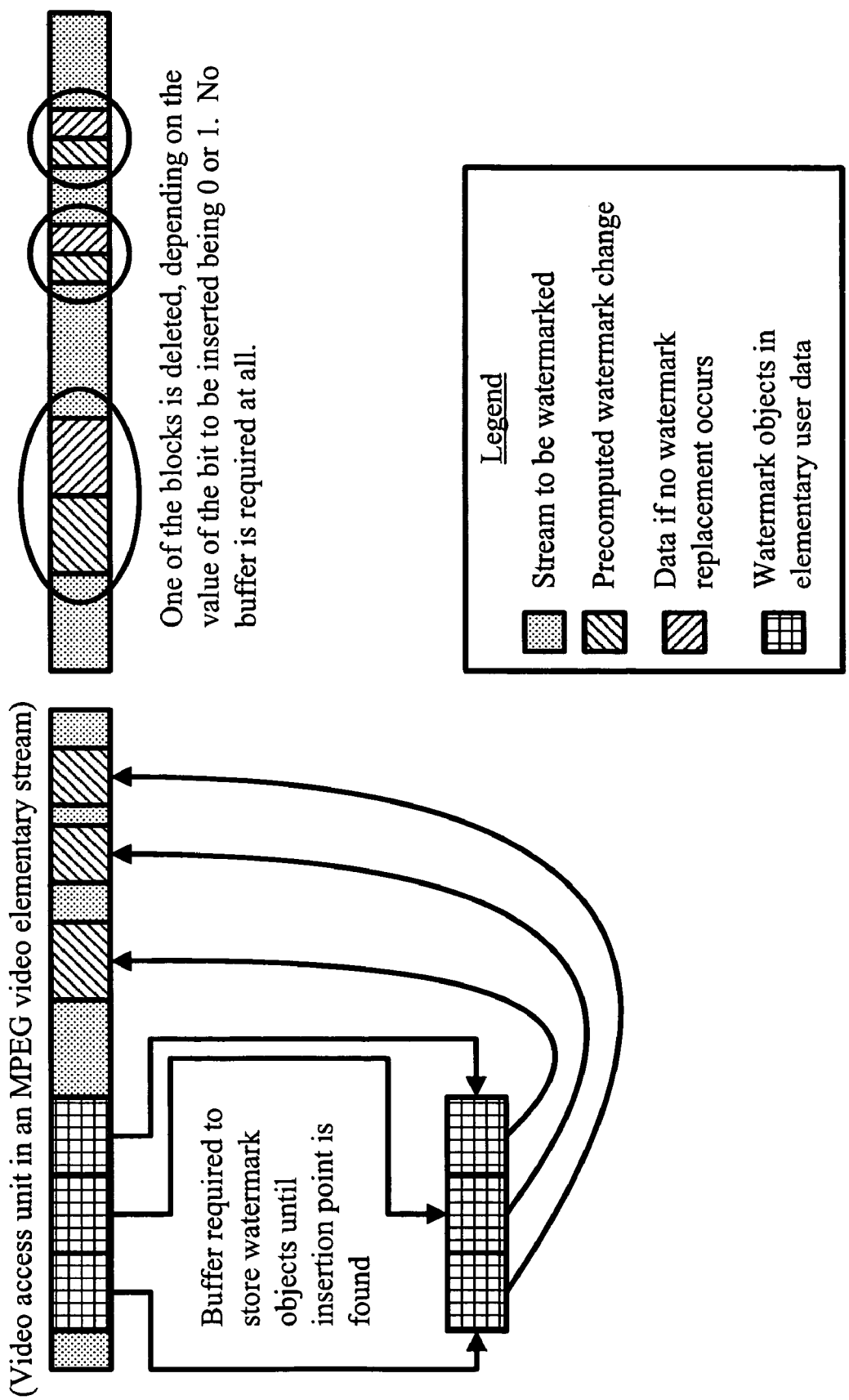
FIG. 23 shows an example of buffered vs. bufferless modes.

Each of the transport systems may require the presence of a target decoder buffer. The target decoder buffer may get filled either as a continuous stream of bytes or by chunks. Watermark objects may be removed from the buffer when they are required for insertion (e.g., when insertion time is met, when insertion location is detected, or both). The buffer size may need to be preset and defined for each stream. Watermarking engines may be grouped in profiles that follow known limits. When the watermark object is stored next to the insertion point, a buffer-less mode may be used. FIG. 23 shows an example of buffered vs. buffer-less modes.

IV. Additional Features

1. Programs and Channels

Multiple channels and programs may be supported differently depending on the transport format chosen. For low level embedding, since the watermark stream may be included inside the stream that it is to watermark, extra information may not be needed for identification. When the stream is embedded as a separate user data stream, the physical information field of watermark objects may be used to indicate a program ID. When used in combination with the security checksums of replacement data, the stream may both be identified and validated.

2. Preventing Playback Without Watermarking

Using unconditional replacement mode in watermark objects, the steam to be watermarked may be rendered unusable until the obligatory replacement is performed. Damaging key areas to a stream (e.g., start codes in an MPEG stream) may be enough to prevent playback. If watermarks are properly inserted, using a watermark object to overwrite the destroyed start code with its original value may restore the stream to a playable state.

3. Multiple Messages

Using a bit mask, along with the bit index of each watermark object, may provide a way to prevent watermark insertion if the watermark is reserved for another message or if the watermark has already been used. To allow the watermark inserter to skip message bits (e.g., if they are reserved for another message) a special mode may be implemented. For example, when the inserter requests the bit corresponding to the bit index of a watermark object, an alternate "do not replace" valued may be returned if the bit is reserved for a different message.

4. Error Recoveries and Nonlinear Playback (Trick Modes)

A system may be set to a zero tolerance policy, where a single missing or corrupted watermark object may lead to an immediate playback. A watermark stream bit rate monitoring may also be implemented to ensure that watermark data is arriving as a reasonable data rate. Since a complete watermark object may be required, a combination of a watermark stream bit rate and a watermark ibject data rate monitoring may ensure a minimum marketing rate of the data stream to be watermarked. In a normal, linear playback, the delivery of all watermark objects may be ensured.

For systems using the "leaky bucket" buffering model, a buffering delay is usually observed at the beginning of the playback. This delay may also be observed after a jump into a random point into the stream. The noncontinuous playback of the stream may be detected by monitoring time stamps of packets arriving into various buffers (e.g., system clocks, decoding, presentation time stamps, etc.) or by using counters (e.g., frame counters) stored or embedded in some frames. Examples of achieving embedded are artificially using a user data block within the elementary stream or by looking at frame headers if the counter is already available. The initial delay may be defined by the specification and may be included in the profile and levels in use for the watermarking of a stream.

5. Elements of Security

Generally, watermarking should never be used in a nonsecured environment where streams and their packets cannot be encrypted or authenticated. The purpose of such practice is to allow watermark objects to be securely processed. This disclosure bears in mind the ability to achieve securing of transport and processing of a watermark stream without breaking compatibility with the design. Several provisions may be made for error provision and attack detection. These include, but are not limited to, data synchronization, data integrity, cross validation, monitoring and responding to attacks, stealth features, and a specific security section.

Data synchronization may be maintained using the checksum of the object (such as a video frame) that is to be watermarked. The system may be able to detect if the watermark data to be inserted is going to be inserted in a proper and/or designated location. Detection may be accomplished by using a validating checksum of the target area. The validating checksum may help prevent accident overwrites.

Data integrity may be ensured by using the checksum of each watermark frame and replacement blocks.

Cross validation may be supported by using checksums stored in both watermark data stream and watermark objects where possible. This use may help ensure that both the watermark object and the object being watermarked may be able to validate each other.

Attacks may be monitored. Action(s) may be taken in response to these attacks. Actions may be taken by using various operational modes (e.g., best effort insertion, abort on any error, etc.).

Stealth features may also be available since watermark objects may be overwritten or deleted after they have been used.

When watermarks are embedded as user data in an encrypted video elementary stream, it may be difficult for a pirate to discard watermark objects and proceed with copying video content. Discarding watermark objects would mean that the pirate would likely have access to the decryption key for the encrypted object. However, when watermark objects are carried as separate data streams, pirating may happen. A way to avert this problem is independently and securely transmitting at least one extra data set to or along with one or more watermark objects. The extra data set may be validated and decrypted using a digital signature verification key.

A specific security section, as well as an auxiliary section, may contain extra security enforcement features. Examples of these features include, but are not limited to, movie expiration data and a theatre ID that requires verification.

V. CONCLUSION

The watermark transport system may present a versatile way of packaging, transporting and delivering watermark information. It may also be able to cover compressed and uncompressed data streams (e.g., audio, video, unknown data types, etc.). It may present backward compatibility options by using low level embedding, stream masquerading or user defined streams. User defined streams may offer the capacity to maintain compatibility with authoring systems already in place. The transport mechanism may be suited for streaming and storage models. Also, it may offer techniques to reduce bandwidth requirements of its metadata. The capacity of the watermark transport system to attach watermark objects to physical, spatial or temporal anchor points may offer the implementer a variety of options to combine or choose from. Its programmable reserved code detection may permit a reliable use in MPEG streams and their derivatives, while allowing further use to other systems. The expandability of the watermark transport system and its capacity to carry auxiliary data may open the door for future developments and enhancements.

The foregoing descriptions of the embodiments of the disclosure have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the disclosure and its practical application to thereby enable others skilled in the art to best utilize it in various embodiments and with various modifications as are suited to the particular use contemplated without departing from the spirit and scope of the disclosure. In fact, after reading the above description, it will be apparent to one skilled in the relevant art(s) how to implement the disclosure in alternative embodiments. Thus, the disclosure should not be limited by any of the above described example embodiments. For example, the scope of this disclosure is intended to not only cover MPEG encoding, but also non-MPEG encoding, such as VC-1 and Sorensen.

In addition, it should be understood that any figures, graphs, tables, examples, etc., which highlight the functionality and advantages of the disclosure, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the disclosure in any way.

Furthermore, it is the applicants' intent that only claims that include the express language "means for" or "step for" be interpreted under 35 U.S.C. § 112, paragraph 6. Claims that do not expressly include the phrase "means for" or "step for" are not to be interpreted under 35 U.S.C. § 112, paragraph 6.

What is claimed is:

1. A method for transporting watermarked data comprising:
   a. preprocessing at least one elementary data stream, said preprocessing consisting of either demultiplexing said elementary data stream or including at least one extra elementary data stream among said at least one elementary data stream; and
   b. inserting at least one watermark, said inserting comprising:
      i. creating at least one watermark object, said creating including precomputing at least one watermark change data using watermark metadata, said at least one watermark object comprising:
         1. said watermark metadata; and
         2. said watermark change data; and
      ii. transporting said at least one watermark object, said transporting comprising at least one of the following:

1. packetizing and multiplexing said at least one watermark object into said at least one elementary data stream where said demultiplexing occurs; and
2. overwriting said extra elementary data stream with said at least one watermark object where said extra elementary data stream is inserted; and wherein said packetizing and multiplexing occurs, processing said at least one watermark object, said processing including at least one of the following:
1. demultiplexing at least one packet from said at least one elementary data stream having said at least one watermark object that is packetized and multiplexed;
2. creating a watermarked elementary data stream by using said at least one watermark object to watermark said at least one elementary data stream having said at least one watermark object that is packetized and multiplexed; and
3. reinserting said watermarked elementary data stream into said at least one elementary data stream having said at least one watermark object that is packetized and multiplexed; and wherein said overwriting occurs, processing said at least one watermark object, said processing including at least one of the following:
1. discarding said at least one watermark object after said creating a watermarked elementary data stream; and
2. decoding said watermarked elementary data stream.

2. A method according to claim 1, wherein said watermarking is synchronized with said demultiplexing.

3. A method according to claim 1, wherein said watermark object is stored within said elementary data stream to watermark said elementary data stream.

4. A method according to claim 1, wherein each of said elementary data stream is stored separately in a container file, said container file being transmitted to a watermark inserter.

5. A method according to claim 1, wherein said method utilizing at least one of the following buffering models:
a. a basic storage buffering model;
b. a streaming buffering model; and
c. a stolen bits model.

6. A method according to claim 1, further including overwriting at least one of the following:
a. said elementary data stream;
b. said buffer; and
c. said memory.

7. A method according to claim 1, further including introducing supplemental data comprising:
a. user data; and
b. security data.

8. A watermark transport system comprising:
a. an elementary data stream preprocessor configured for preprocessing at least one elementary data stream, said preprocessing consisting of either demultiplexing said elementary data stream or including at least one extra elementary data stream among at least one elementary data stream; and
b. a watermark inserter comprising:
i. a watermark object creator, said watermark object creator configured for creating at least one watermark object, said creating including precomputing at least one watermark change data using watermark metadata, said at least one watermark object comprising:
1. said watermark metadata; and
2. said watermark change data;
ii. a watermark transporter, said watermark transporter configured for transporting said at least one watermark object, said watermark transporter comprising at least one of the following:
1. a packetizer and a multiplexer configured for packetizing and multiplexing said at least one watermark object into said at least one elementary data stream where said demultiplexing occurs; and
2. an overwriter configured for overwriting said extra elementary data stream with said at least one watermark object where said extra elementary data stream is inserted; and
iii. a watermark object processor, said watermark object processor configured for processing said at least one watermark object, wherein said packetizing and multiplexing occurs, said watermark object processor including at least one of the following:
1. a demultiplexer configured for demultiplexing at least one packet from said at least one elementary data stream having said at least one watermark object that is packetized and multiplexed;
2. a watermarked elementary data stream creator configured for creating a watermarked elementary data stream by using said at least one watermark object to watermark said at least one elementary data stream having said at least one watermark object that is packetized and multiplexed; and
3. a reinserter configured for reinserting said watermarked elementary data stream into said at least one elementary data stream having said at least one watermark object that is packetized and multiplexed; and wherein said overwriting occurs, said watermark object processor including at least one of the following:
1. a discarder configured for discarding said at least one watermark object after said creating a watermarked elementary data stream; and
2. a decoder configured for decoding said watermarked elementary data stream.

9. A system according to claim 8, wherein said watermarking is synchronized with said demultiplexing.

10. A system according to claim 8, wherein said watermark object is stored within said elementary data stream to watermark said elementary data stream.

11. A system according to claim 8, further including a container file for separately storing each of said elementary data stream, said container file configured to be transmitted to said watermark inserter.

12. A system according to claim 8, wherein said system utilizing at least one of the following buffering models:
a. a basic storage buffering model;
b. a streaming buffering model; and
c. a stolen bits model.

13. A system according to claim 8, wherein said system overwrites at least one of the following:
a. said elementary data stream;
b. said buffer; and
c. said memory.

14. A system according to claim 8, wherein said system introduces supplemental data comprising:
a. user data; and
b. security data.

* * * * *